United States Patent [19]

De et al.

[11] Patent Number: 4,831,331

[45] Date of Patent: May 16, 1989

[54] METHOD AND APPARATUS FOR INTERFACE LOCATION DETERMINATION

[75] Inventors: Bibhas R. De, Laguna Beach; Dorothy A. Keech, Fullerton, both of Calif.

[73] Assignee: Chevron Research Company, San Francisco, Calif.

[21] Appl. No.: 36,837

[22] Filed: Apr. 10, 1987

[51] Int. Cl.[4] .............................................. G01V 3/30
[52] U.S. Cl. .................................. 324/338; 343/770; 342/175
[58] Field of Search .............................. 324/332–344; 342/175; 343/767, 770, 771

[56] References Cited

U.S. PATENT DOCUMENTS

| | | | |
|---|---|---|---|
| 3,944,910 | 3/1976 | Rau | 324/338 |
| 4,151,457 | 4/1979 | Rau | 334/333 X |
| 4,156,177 | 5/1979 | Coates | 324/338 |
| 4,300,098 | 11/1981 | Huchital et al. | 324/338 |
| 4,322,731 | 3/1982 | Drabowitch | 343/771 X |
| 4,338,567 | 7/1982 | Coates | 324/338 |
| 4,360,778 | 11/1982 | Freedman | 324/339 |
| 4,361,808 | 11/1982 | Kern et al. | 324/366 |
| 4,370,611 | 1/1983 | Gregory et al. | 324/61 |
| 4,511,842 | 4/1985 | Moran et al. | 324/338 |
| 4,511,843 | 4/1985 | Thoraval | 324/338 |
| 4,529,938 | 7/1985 | Hagiwara | 324/339 |
| 4,536,714 | 8/1985 | Clark | 324/338 |
| 4,538,109 | 8/1985 | Clark | 324/338 |
| 4,547,733 | 10/1985 | Thoraval | 324/338 |
| 4,578,645 | 3/1986 | Hoehn, Jr. | 324/338 |
| 4,594,551 | 6/1986 | Cox et al. | 324/341 |
| 4,630,677 | 12/1986 | Jakob | 166/68 |
| 4,678,997 | 7/1987 | Janes | 324/341 |
| 4,727,936 | 3/1988 | Mioduszewski et al. | 166/53 |

FOREIGN PATENT DOCUMENTS 0163574 12/1985 European Pat. Off. ............ 324/341

OTHER PUBLICATIONS

F. Schivelle, "Petroleum Contamination of the Sub-soil–A Hydrological Problem," The Joint Problems of Oil & Water Ind., Symposium at Brighton, England (1967).

J. Van Dam, "The Migration of Hydrocarbon in Water Bearing Stratum," Id.

Birchak et al., "High Dielectric Constant Microwave Prolecs for Sensing Soil Moisture", Proceedings of the IEEE (Jan. 1974) p. 93.

D. R. Fussel et al., "Revised Inland Oil Spill Clean–Up Manual", Report 7/81 Jun. 1981.

T. L. DePastrovich et al., "Protection of Groundwater from Oil Pollution", Report 3/79 Apr. 1979.

K. Sanfinya et al., "Experimental and Theoretical Study of the. . . " SPE 14188 (1985).

Anaren Catalog, Publication M9010–08, 1981 p. 21.

Primary Examiner—Reinhard J. Eisenzopf
Assistant Examiner—Warren S. Edmonds
Attorney, Agent, or Firm—S. R. La Paglia; E. J. Keeling

[57] ABSTRACT

A method and apparatus for determining the interface between two materials having different dielectric properties, especially in determining the thickness of a hydrocarbon layer on ground water, is disclosed. The apparatus consists of an air-filled, cased surveillance well in which a logging tool is raised and lowered. The logging tool contains an electromagnetic receiving antenna and two transmitting antennas located above and below the receiving antenna. A first wave and a second wave are transmitted from the transmitting antennas. The first and second waves are offset 180° to produce "sum" and "delta" signals using a 180° hybrid. Alternatively, a single wave can be transmitted from a central transmitting antenna to receiving antennas located above and below the transmitting antenna. The received signals are then phase shifted 180° using a 180° hybrid to produce sum and delta signals. As the tool is raised and lowered in the well bore, changes in the sum and delta signals will be observed when an interface is passed. A logging tool for use in petroleum production and exploration wells is also disclosed.

47 Claims, 15 Drawing Sheets

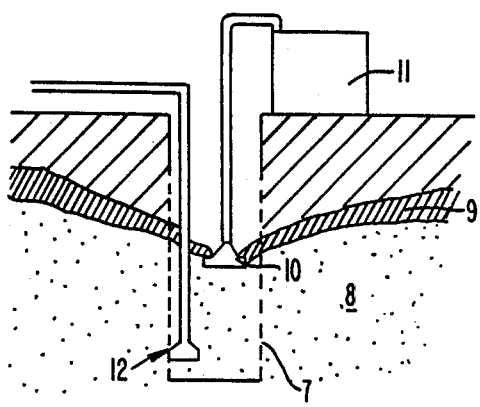
FIG._1. PRIOR ART
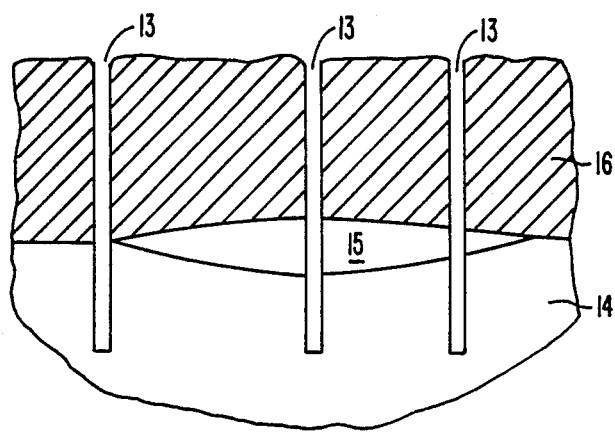
FIG._2. PRIOR ART
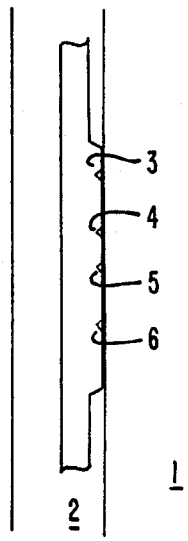
FIG._3. PRIOR ART
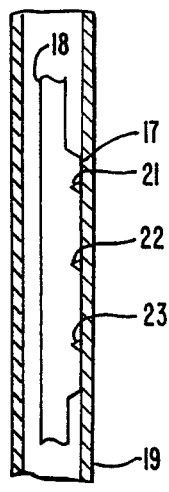
FIG._4.
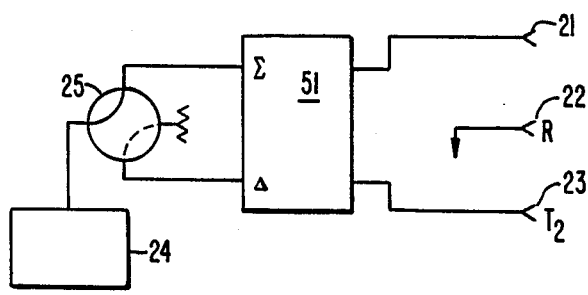
FIG._5.
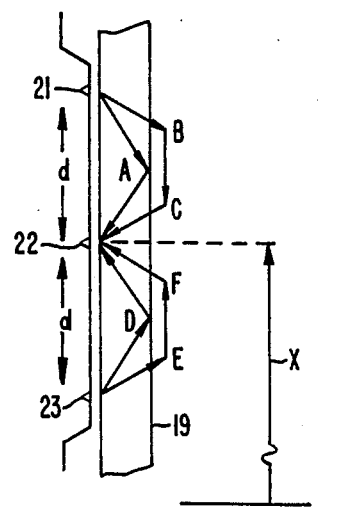
FIG._6.

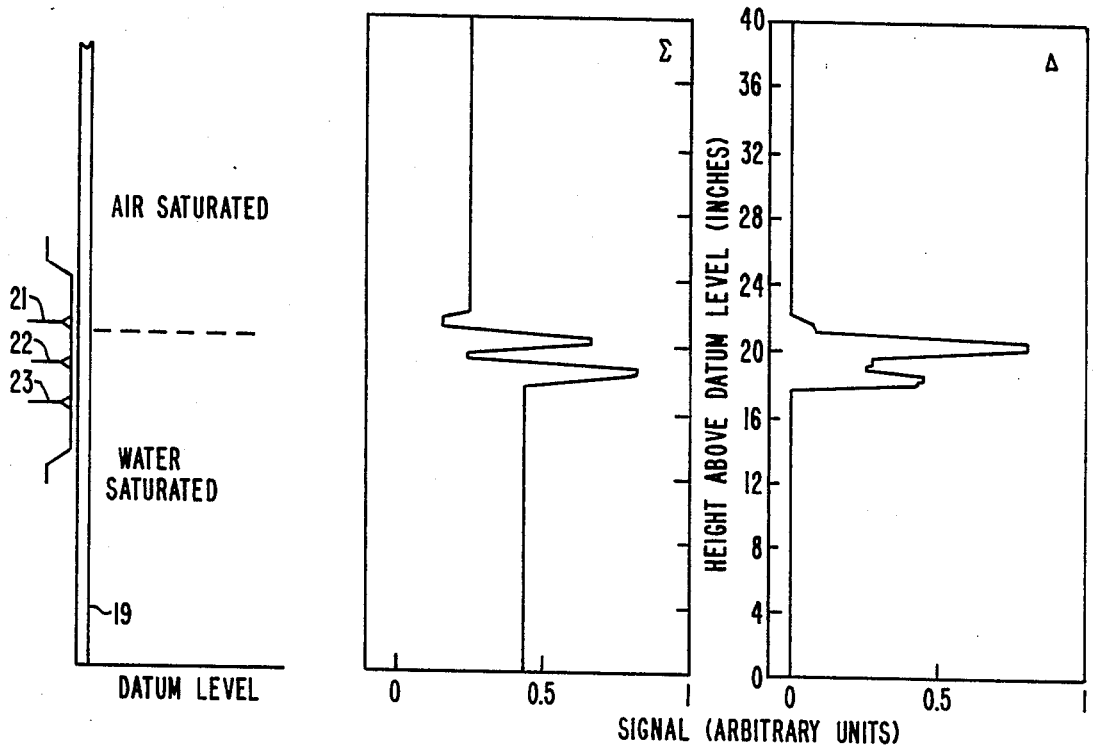
FIG._7.
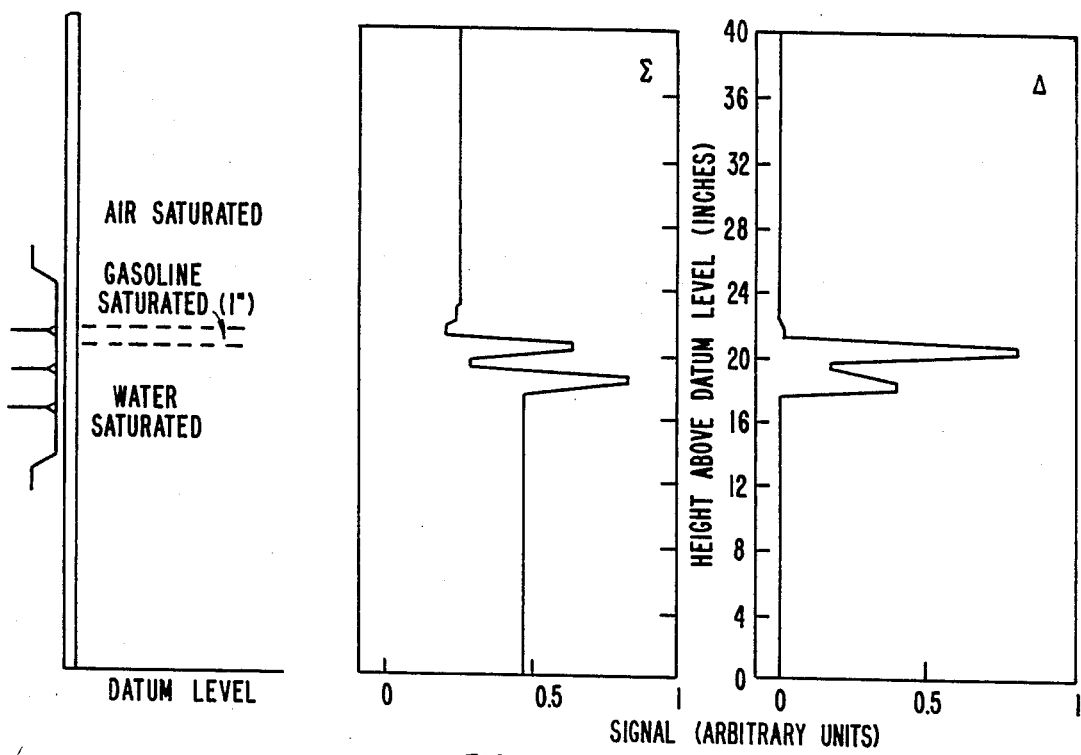
FIG._8.

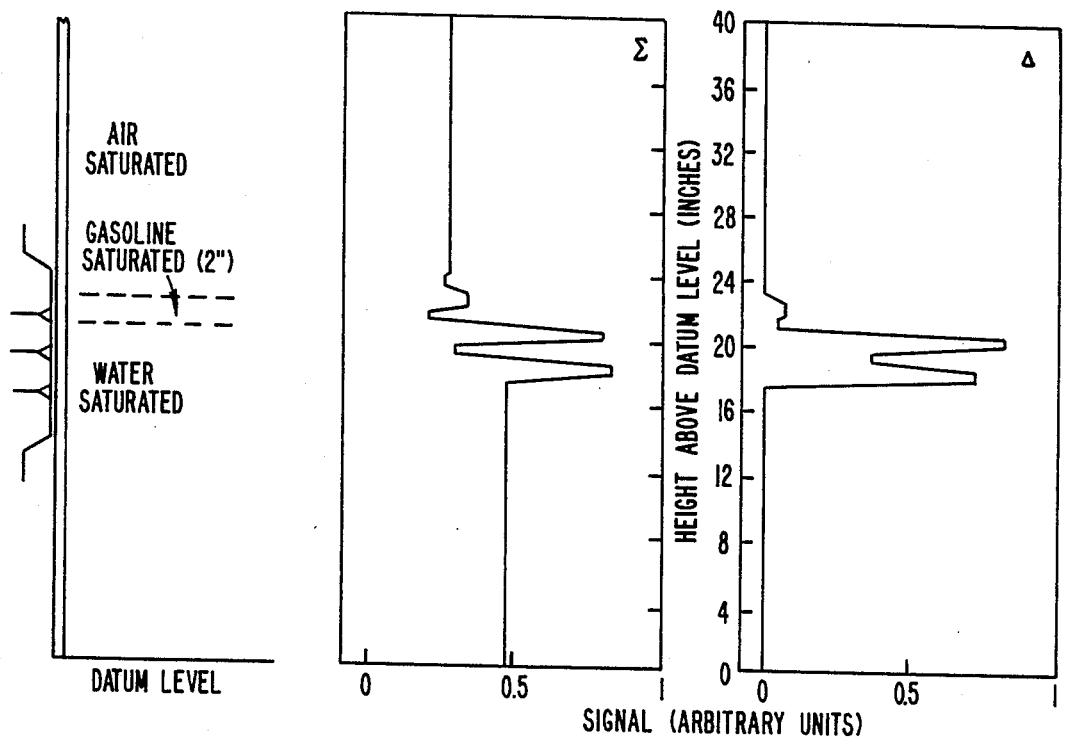
FIG._9.
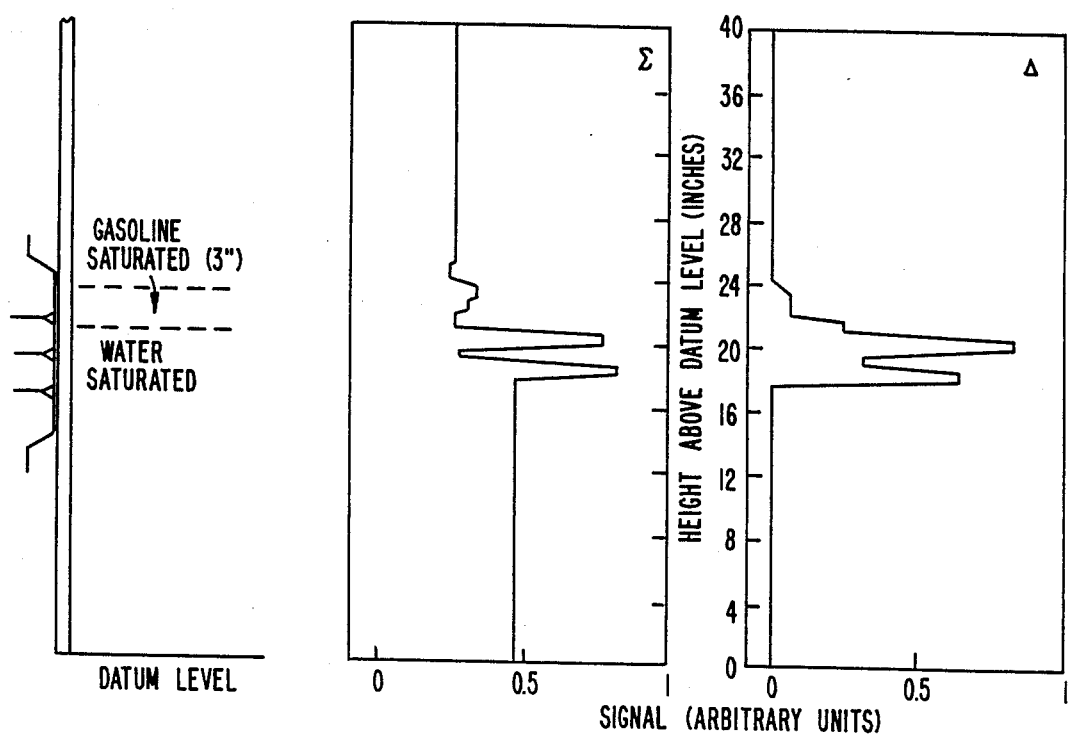
FIG._10.

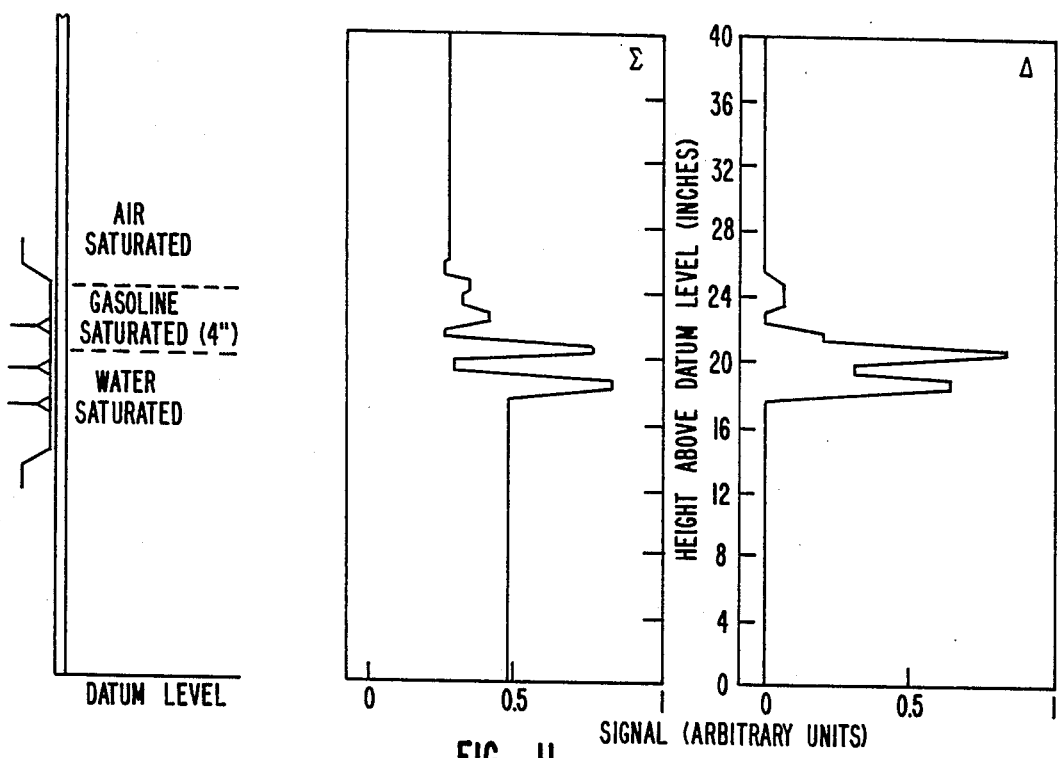
FIG.—11.
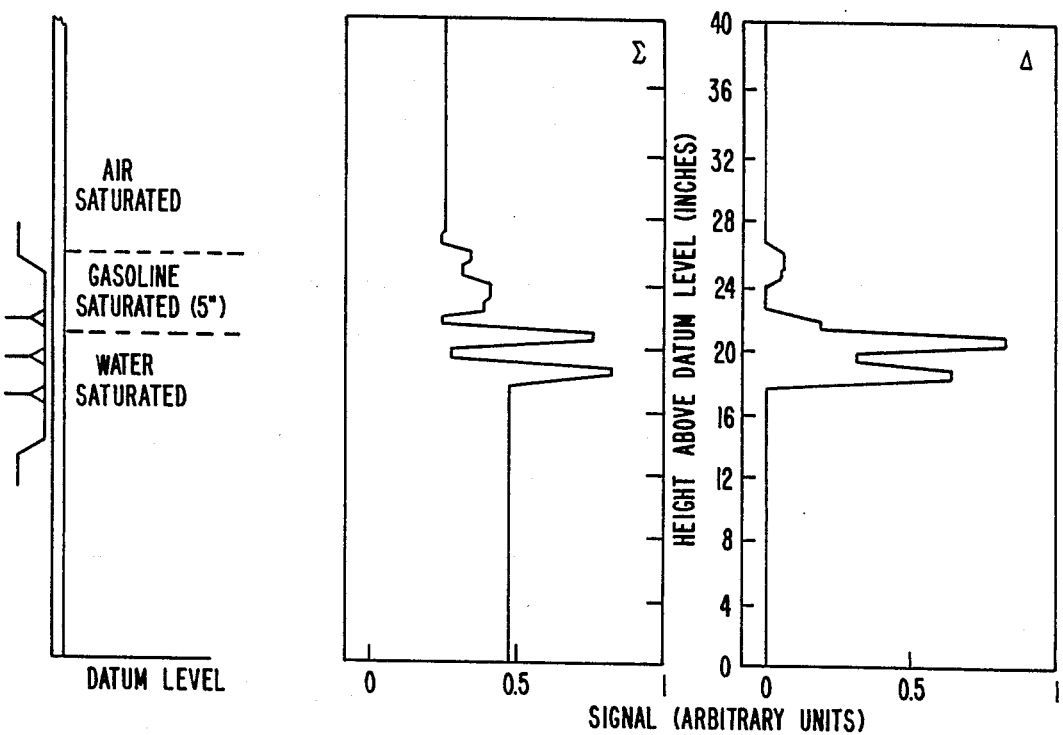
FIG.—12.

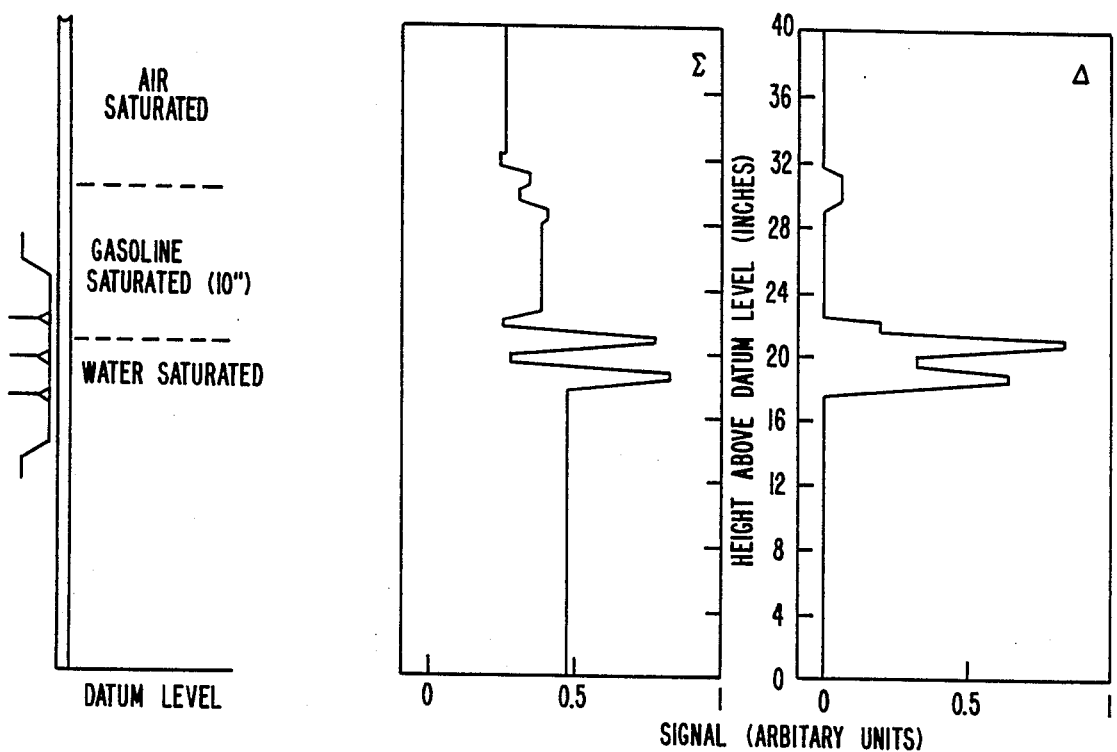
FIG._13.
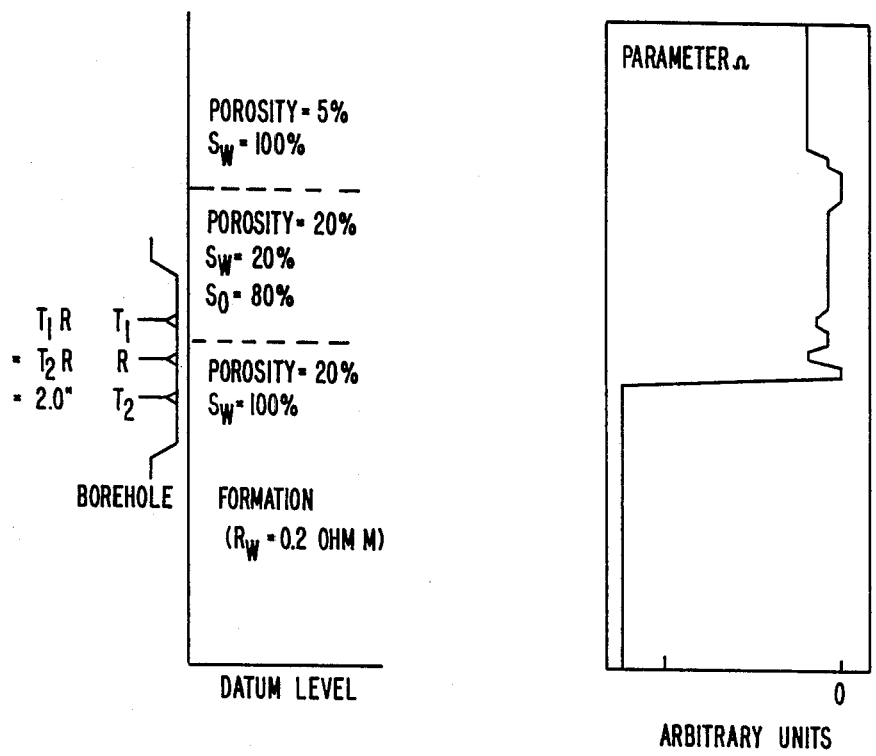
FIG._25.

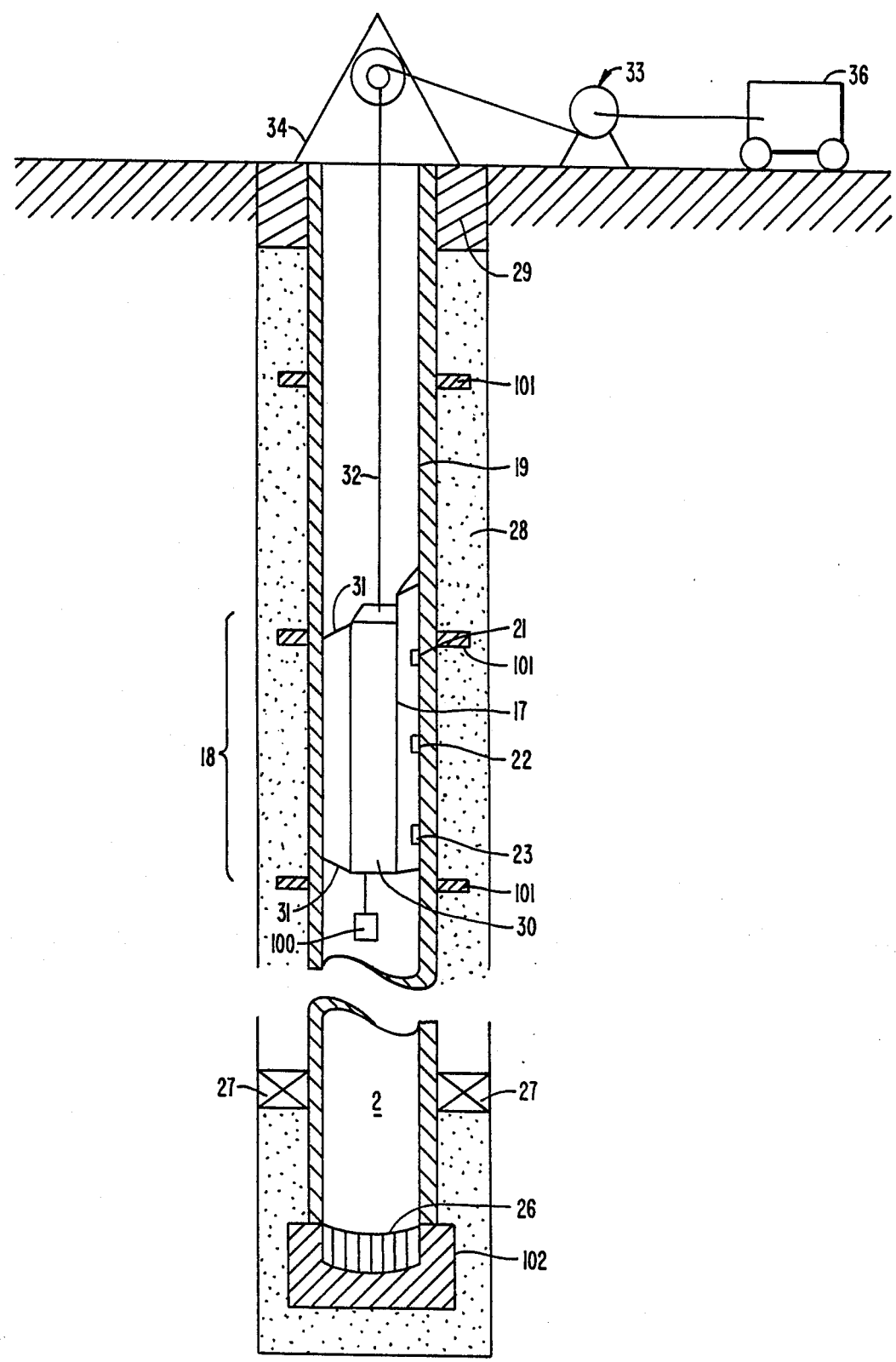
FIG._14.
TOOL IN THE WELLBORE

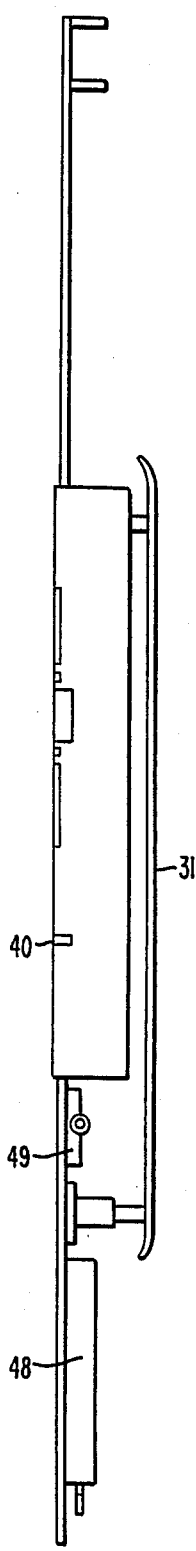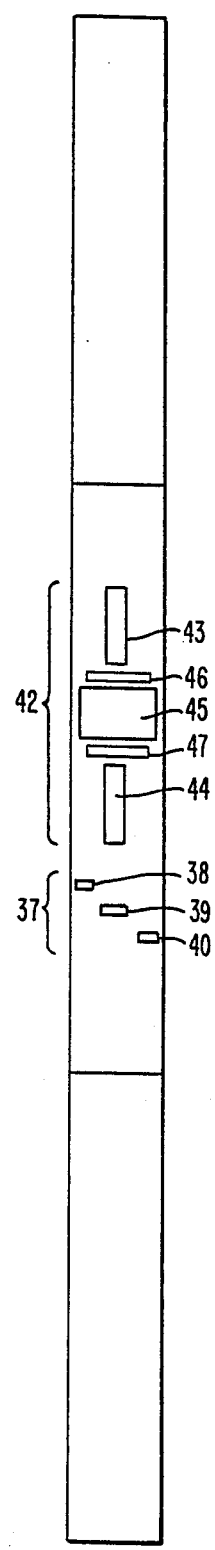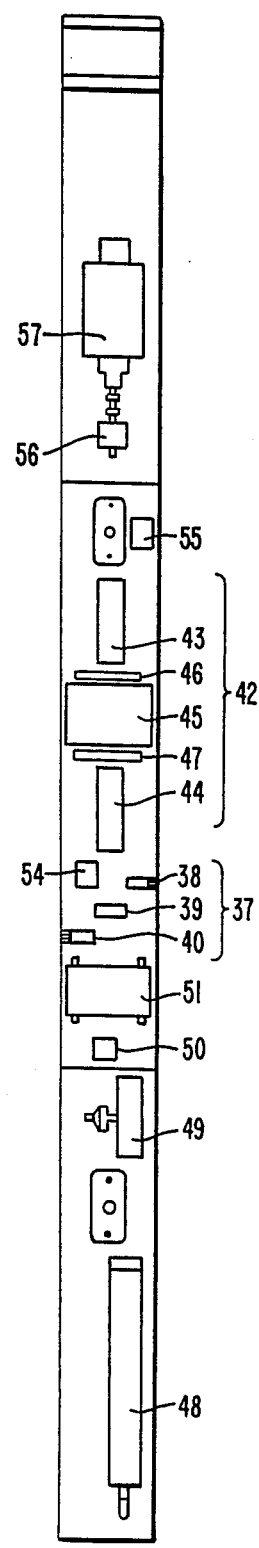
FIG._15a.   FIG._15b.   FIG._15c.
LOGGING TOOL

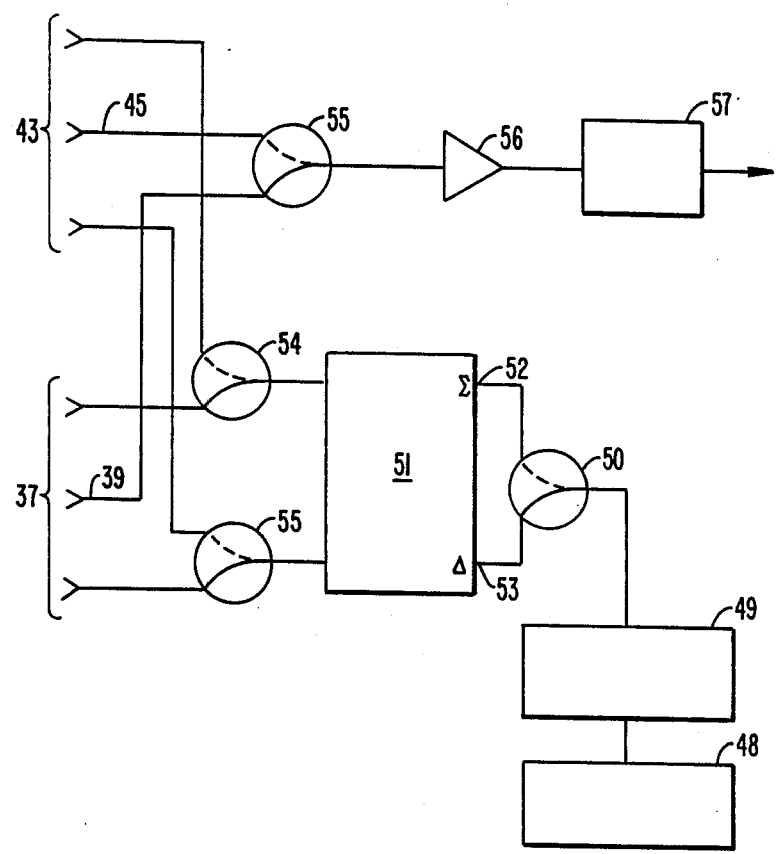
FIG._16.
RF SYSTEM BLOCK DIAGRAM
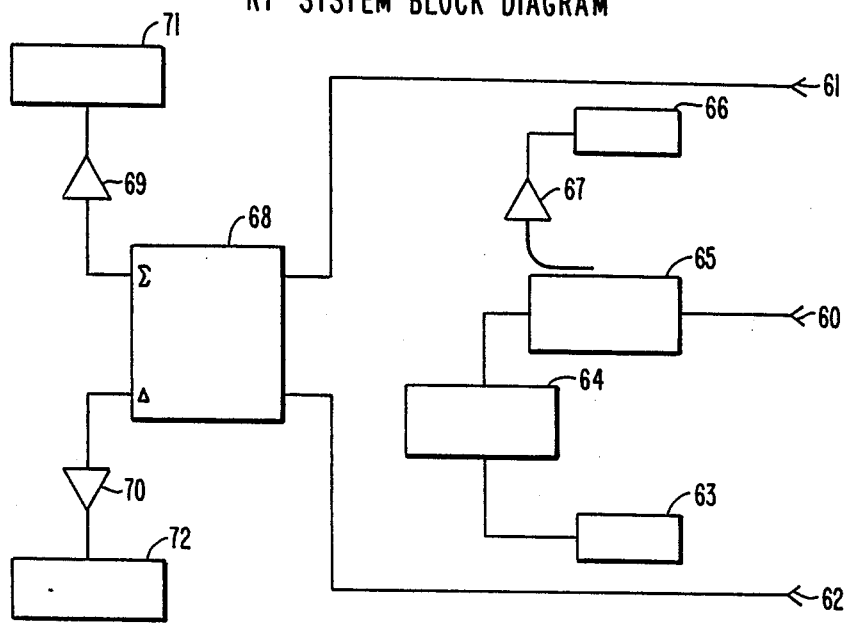
FIG._18.
RF SYSTEM BLOCK DIAGRAM

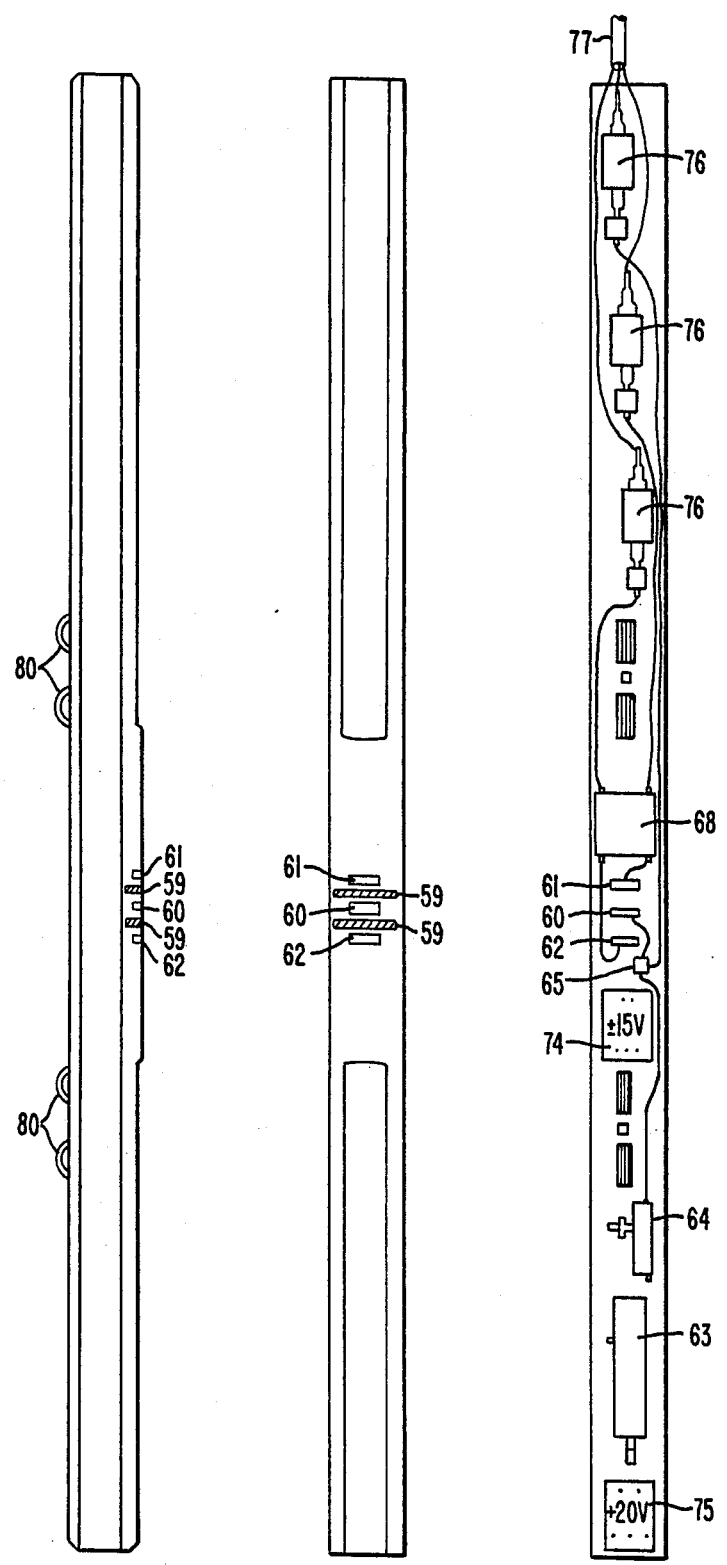
FIG.\_17a.  FIG.\_17b.  FIG.\_17c.
LOGGING TOOL

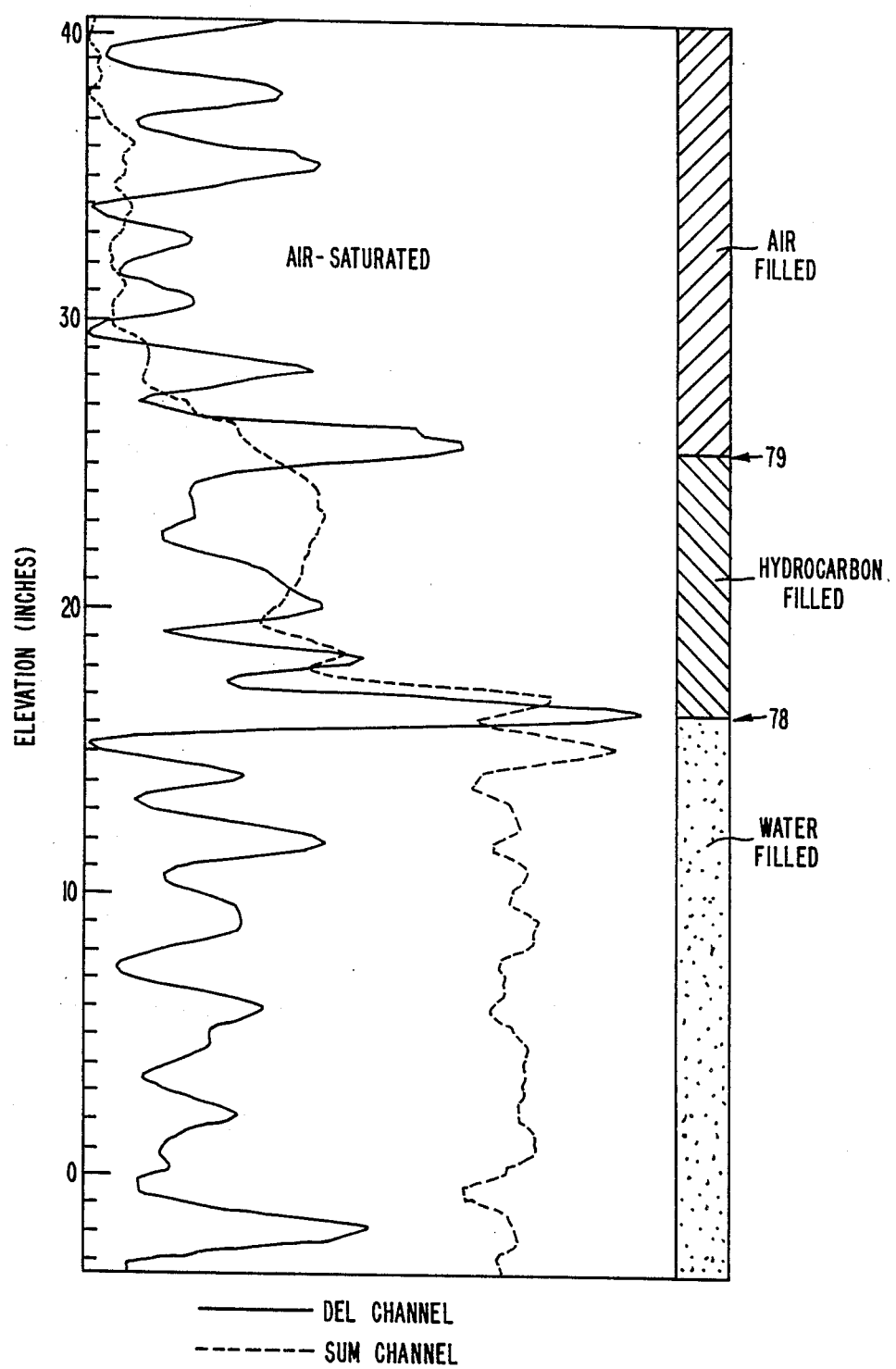
FIG._19.

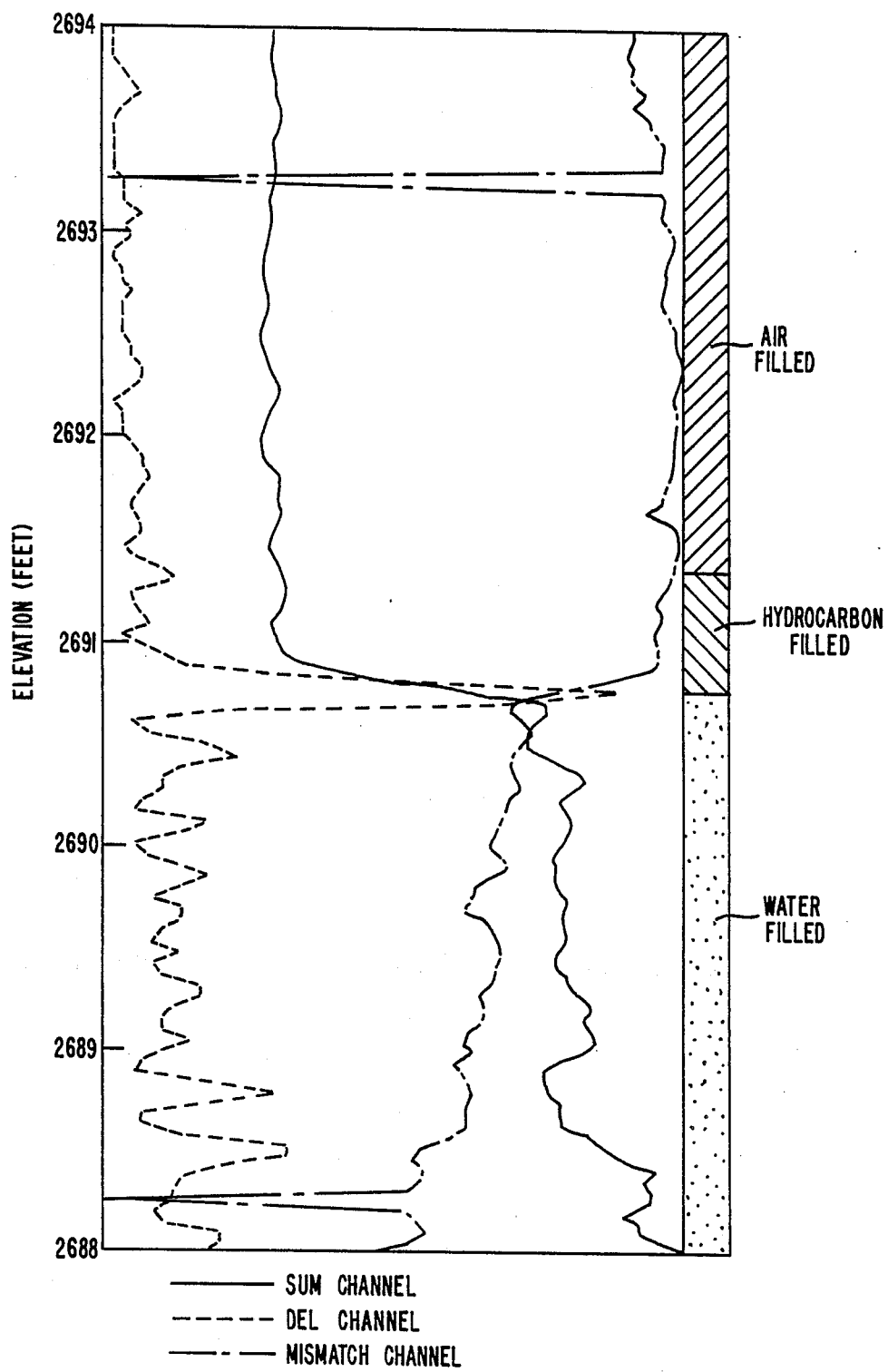
FIG._20.

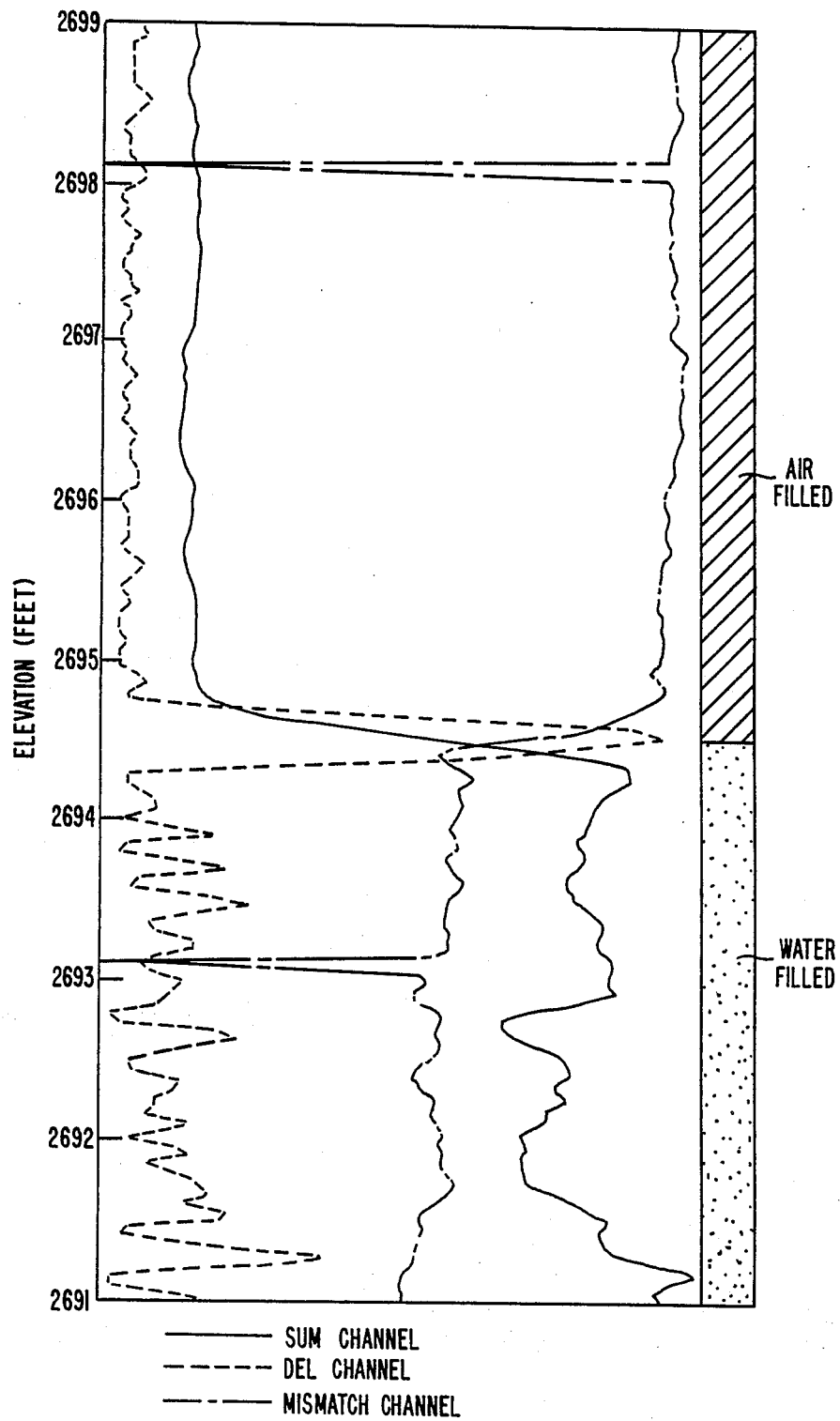
FIG._21.

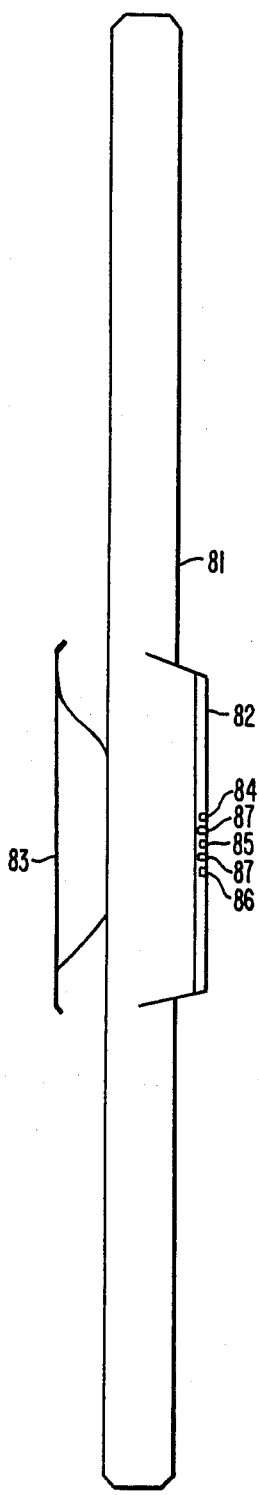
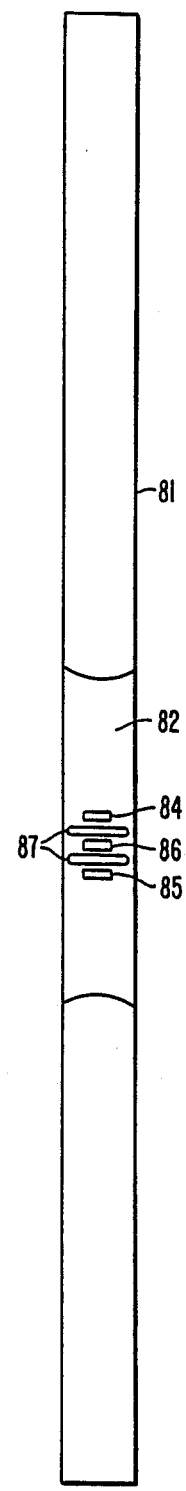
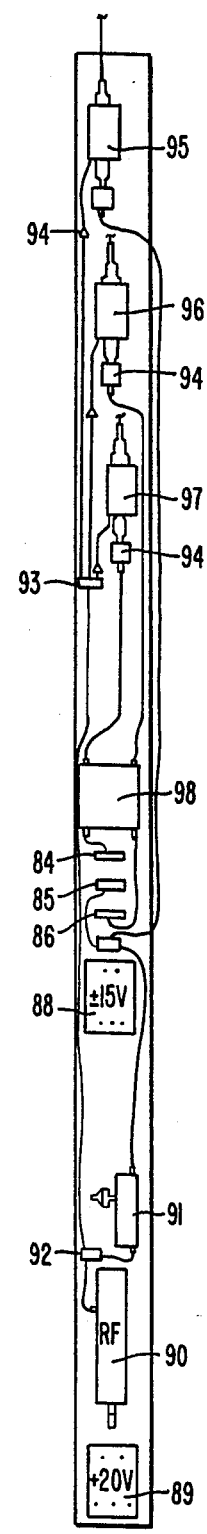
FIG._22a.    FIG._22b.    FIG._22c.
LOGGING TOOL

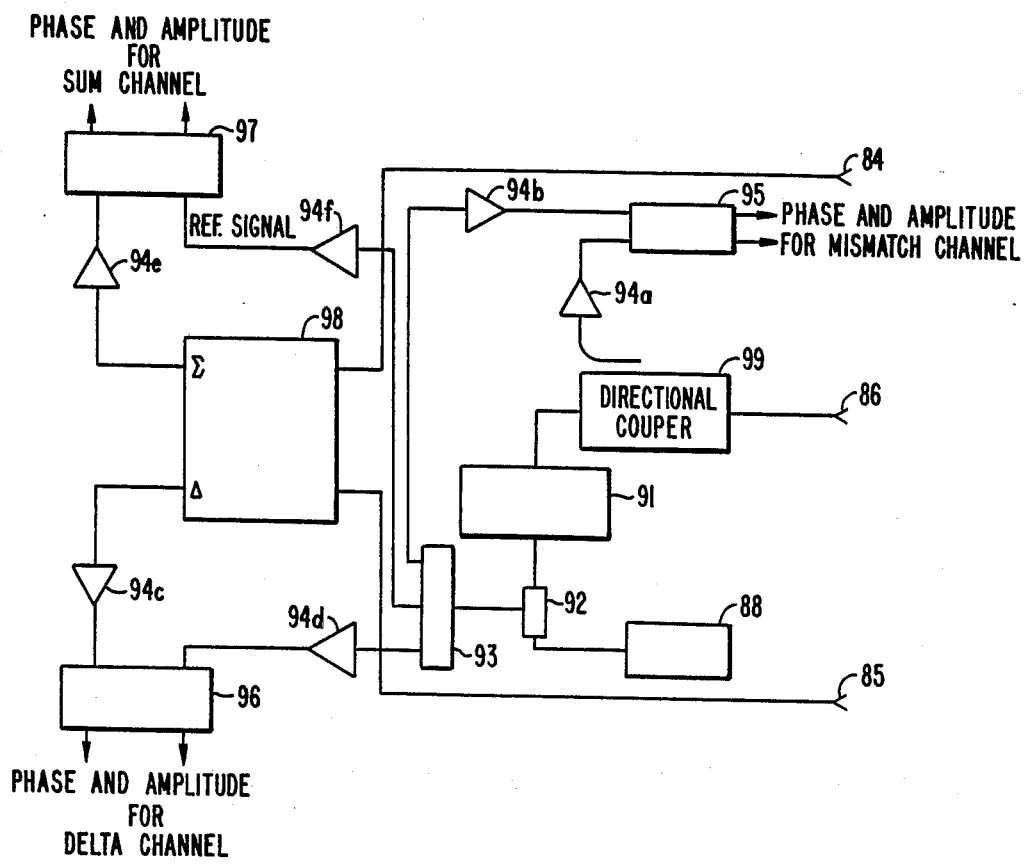
FIG._23.
RF SYSTEM BLOCK DIAGRAM

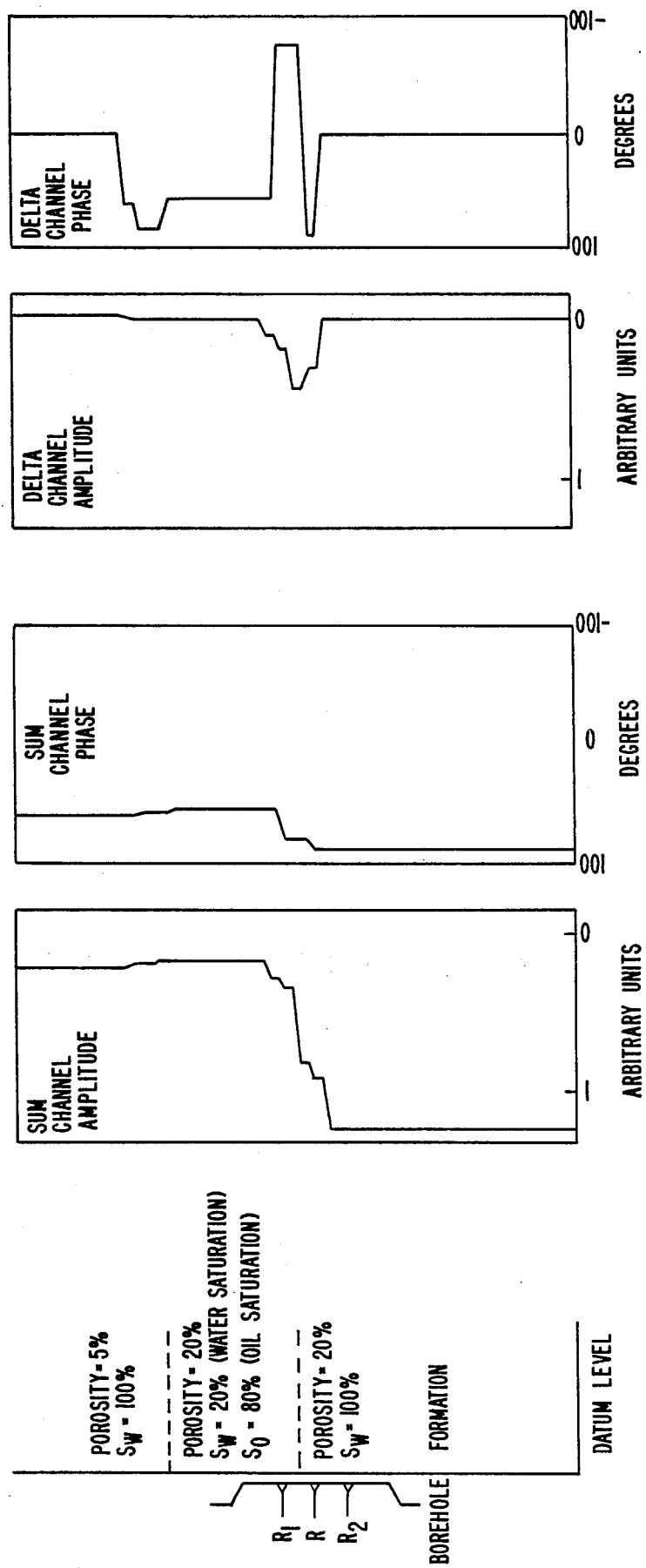
FIG.—24.

METHOD AND APPARATUS FOR INTERFACE LOCATION DETERMINATION

FIELD OF THE INVENTION

This invention is directed generally towards the determination of the location of hydrocarbons in a formation. Specifically, this invention is directed toward the location of fluid interfaces in a hydrocarbon bearing formation.

BACKGROUND OF THE INVENTION

In recent years serious concern for the protection of groundwater from various pollutants has risen. It has been found that contaminants may enter groundwater from various surface locations rendering groundwater unsuitable for drinking or other uses. Among the potential sources of groundwater pollution are leaking underground tanks and, specifically, underground hydrocarbon storage tanks. In many cases, gasoline storage tanks associated with service stations have been found to leak gasoline to the water table.

Light hydrocarbons (e.g., gasoline) lost from refinery tanks, pipelines and service stations gravitates downward to settle on top of the water table in the shape of a plume. In the center of the plume, the hydrocarbon thickness could range up to a couple of feet. Recovery of spilled gasoline is usually effected by pumping the fluid back up to the surface, for example, see U.S. Pat. Nos. 4,630,677; 4,497,370; and 4,273,650.

It is necessary to obtain an estimate of the total quantity of gasoline remaining in the plume at any given time to estimate the volume of hydrocarbon spilled as well as to assess the progress of the cleanup. This can be done by determining the thickness of the plume in several locations over its areal extent. The current technique for doing this is to drill an open well through the plume, and let the water and the gasoline flow into the well and stand to their hydrostatic equilibrium levels. The depths of these fluids and thickness of hydrocarbon in the well can then be measured by simple methods readily known to one skilled in the art (see U.S. Pat. No. 4,213,340).

This wellbore is not representative of the fluid/solid matrix in the formation, however, and the thickness of the free-standing column of gasoline in the open well is generally greater than the actual formation thickness of the spilled fluid [J. Van Dam, "The Migration of Hydrocarbons in a Water-Bearing Stratum", Schwille, F., "Petroleum Contamination of the Subsoil—A Hydrological Problem", both in "The Joint Problems of Oil and Water Industries, Symposium held at Brighten, England (1967), all incorporated by reference herein].

No good means of quantifying this discrepancy exist, but it is believed that the two numbers could differ by a factor of as much as 2 to 4. Using the thickness of the hydrocarbon layer in the wellbore to estimate the amount of hydrocarbon spilled would cause a greatly exaggerated estimate of the amount of gasoline spilled.

It is, therefore, desirable to devise a method and means of accurately determining the actual thickness of hydrocarbon in a subsurface formation.

SUMMARY OF THE INVENTION

We have developed a system to measure the hydrocarbon thickness in the formation itself. The measurement consists of lowering a UHF electromagnetic transmission device down an unperforated air-filled well drilled to the lowest seasonal water table or below. A non-metallic Well casing of a material such as PVC which allows electromagnetic transmission is used.

The device is raised from the bottom of the well at approximately 10 to 20 feet per minute. Changes in the UHF transmission are recorded as it passes fluid interfaces (e.g., hydrocarbon/water) in the formation. The changes detected are due to the differences in the dielectric properties of the fluid at two locations. The device is based on the "null balance" concept, i.e., as long as the tool is traversing section of the formation of a homogeneous fluid type a "delta" channel signal remains balanced at zero. When the tool traverses a section of the formation where the dielectric characteristics change (i.e., an interface), this balance is perturbed and a finite signal is recorded. A second channel ("sum") indicates the relative magnitude of the dielectric constant of the fluids in the formation.

The first embodiment of the tool is generally cylindrical with the exception of a protruding pad. The curvature of the pad surface matches that of the inside wall of the plastic casing. On the pad are a receiving antenna, and two transmitting antennas located equal distances above and below the receiving antenna. The three antennas are generally identical in all respects, and they are matched to radiate efficiently through the plastic casing.

When the transmitting antennas are energized through a sum port, they transmit radiation having the same amplitude and phase. When energized through a delta port, the amplitudes are again the same, but the phases differ by 180°. Thus, in the sum-mode, the amplitudes of radiation received at the receiving antenna from the two transmitters are added to one another, while in the delta-mode, they are subtracted from one another.

The sensing of the dielectric constant occurs predominantly via the internally reflected paths within the casing wall, which are influenced by the dielectric constant of the formation opposite the antenna. The paths that travel into the formation and then reenter the casing wall make a relatively small contribution.

To operate the device, it is raised and lowered in the wellbore and the elevation of the tool in the wellbore is carefully monitored. The received signal in the sum-mode remains at a constant level until a liquid/liquid or liquid/vapor interface is passed. It shifts to a different magnitude when an interface is crossed corresponding to the change in dielectric constant from one zone to the other. The delta-mode signal remains at zero (i.e., the difference between the transmissions is zero) before passing an interface and becomes finite (i.e., the difference is non-zero) only during the crossing of a interface boundary. The probe thus senses variations in the dielectric constant properties of the formation, rather than its absolute values. With this information it is possible to determine the exact location of liquid/liquid (i.e., water/hydrocarbon) and liquid/vapor (i.e., hydrocarbon/air) interfaces and, therefore, the hydrocarbon layer thickness in the formation.

In a second preferred embodiment, the device is designed to operate on a continuous basis by supplying 2 receiving antennas with a single transmission antenna located between them. Signals are constantly received at the receiving antennas and one of the received signals is phase shifted 180° to create a delta signal.

In summary, a method of determining the location of an interface of materials having differing dielectric properties is disclosed comprising the steps of transmitting electromagnetic radiation from a first transmitting antenna and a second transmitting antenna in a wellbore, said radiation having a common phase and amplitude, said first transmitting antenna located above said second transmitting antenna; receiving a sum signal at a receiving antenna located between said first transmitting antenna and said second transmitting antenna; transmitting electromagnetic radiation having a common amplitude and phases differing by 180° from said first and said second transmitting antennas; receiving a delta signal at said receiving antenna, and; monitoring said sum and said delta signals.

Alternatively, the method of determining the location of an interface of materials having differing dielectric properties comprises the steps of: transmitting electromagnetic radiation from a transmitting antenna; receiving a first signal at a first receiving antenna located above said transmitting antenna; receiving a second signal at a second receiving antenna located below said receiving antenna; adding said first and said second signals to create a sum signal; phase shifting said first and said second signals a total of 180° to produce phase shifted signals; adding said phase shifted signals to create a delta signal, and; monitoring said sum and said delta signals.

An apparatus for determining the location of an interface of materials having differing dielectric properties is disclosed comprising: a first radiation transmitting means; a second radiation transmitting means, said second radiation transmitting means alternately capable of transmitting radiation of the same phase as said first radiation transmitting means and capable of transmitting radiation 180° out of phase from said first radiation transmitting means; radiation receiving means; and means for monitoring a received signal.

An alternative apparatus for determining the location of an interface of materials having differing dielectric properties is disclosed comprising: a radiation transmitting antenna; a first receiving antenna above said transmitting antenna; a second radiation receiving antenna below said transmitting antenna; means for phase shifting and combining a signal from said first and said second receiving antennas to produce a delta signal; and means for monitoring the delta signal.

The concept of null balanced well logging will also find utility in logging crude oil production or exploration wells. A third embodiment is described that would be utilized in the logging of crude oil and natural gas wells.

BRIEF DESCRIPTION OF THE DRAWINGS

FIG. 1 is a cross section of a subterranean formation showing the devices used to remove hydrocarbons from groundwater.

FIG. 2 is a cross section of a subterranean formation illustrating the method of determining the volume of hydrocarbons in a subterranean formation.

FIG. 3 illustrates schematically a prior art well logging device used in petroleum production wells.

FIG. 4 is a schematic diagram generally illustrating the layout of the present well logging tool.

FIG. 5 is a generalized RF diagram for the present invention.

FIG. 6 schematically illustrates the method of operation of the present invention.

FIGS. 7 to 13 are idealized (i.e., numerical simulations) well logs using the present invention for hydrocarbon layer thickness of 0", 1", 2", 3", 4", 5", and 10", respectively. The formation conditions for the corresponding depths are shown in each Figure on the left side of the FIGURE.

FIG. 14 shows a schematic of the present invention in a subsurface formation.

FIGS. 15a-c are a detailed drawing of the first preferred embodiment in side view (FIG. 15a), front view (FIG. 15b) and cutaway rear view (FIG. 15c).

FIG. 16 is a detailed RF diagram of the first preferred embodiment.

FIGS. 17a-c are detailed drawing of the second preferred embodiment in side view (FIG. 17a), front view (FIG. 17b) and cutaway rear view (FIG. 17c).

FIG. 18 is a detailed RF diagram of the second preferred embodiment.

FIG. 19 is a well log obtained with the second preferred embodiment in a laboratory logging well in a model formation with a sand matrix.

FIG. 20 is a well log obtained with the second preferred embodiment in a subsurface well in Boise, Id.

FIG. 21 is a well log obtained with the second preferred embodiment in a well in Boise, Idaho with no hydrocarbon layer.

FIGS. 22a-c are detailed drawing of the third preferred embodiment inside view (FIG. 23a), front view (FIG. 23b), and cutaway rear view (FIG. 23c).

FIG. 23 is an RF diagram for the third preferred embodiment.

FIG. 24 is an idealized (i.e., numerical simulation) well log for the third preferred embodiment.

FIG. 25 is a simulated well log illustrating the use of an "omega" channel.

DESCRIPTION OF THE PREFERRED EMBODIMENTS

Recovery of spilled hyrdocarbons is usually effected by pumping the fluid back up to the surface, as shown in FIG. 1. A slotted well liner 7 is inserted into a subterranean formation. The formation contains a water saturated region 8, and a hydrocarbon saturated region 9. A recovery pump 10 pumps the hydrocarbon 9 to a surface storage facility 11. A water table depression pump 12 is also used in most applications. The water table depression pump serves to draw down the water table below its natural level. This creates a "sink" in which hydrocarbon will tend to accumulate.

In order to determine the effectiveness of this recovery procedure, it is necessary to obtain an estimate of the total quantity of gasoline remaining in the plume at any given time. This can be done as shown in FIG. 2 by determining the thickness of the plume in several locations at a number of surveillance wells 13. The current technique for determining the thickness of a hydrocarbon layer in a surveillance well is to allow the water and the gasoline flow into the surveillance well and stand at their hydrostatic equilibrium levels. The thickness of these fluid layers in the well can then be measured by simple methods. However, the thickness of a free-standing column of gasoline is known to be substantially greater than the actual formation thickness of the spilled fluid, causing a greatly exaggerated estimate of the amount of hydrocarbon spilled.

Some conventional logging tools employing electromagnetic or acoustic waves to probe a petroleum production formation are shown in FIG. 3. The wave is transmitted into the formation 1 from the borehole 2 from an antenna 3, and is received at another point 4 above or below the transmitter after the wave has traversed some distance in the formation. The amplitude and the phase of the received signal contain information (dielectric constant and conductivity in case of electromagnetic waves, velocity and attenuation in case of acoustic waves) about the formation. A duplicate receiving location 5 is usually employed, thereby obtaining measurements that eliminate certain unknown factors. Additionally by employing a duplicate transmitting location 6 (above or below the receiver pair), the effects of alternate upward and downward transmissions are averaged to achieve "borehole compensation". Examples of such tools are the Schlumberger TM Borehole-compensated BBHC) Sonic Tool, the Electromagnetic Propagation Tool (EPT), and the electromagnetic tool called the Deep Propagation Tool (DPT).

The EPT or DPT device is especially useful in locating an interface between materials with radically different dielectric properties (e.g., water and gasoline). However, the above-described devices have not been utilized in locating materials in groundwater and., more importantly, for reasons which are illustrated below, this type of tool is not useful in locating the interface between materials having similar dielectric properties (e.g., air and gasoline). Therefore, the prior art devices would not be useful in determining the thickness of a hydrocarbon layer in groundwater because they measure absolute properties of the formation and it would not be possible to locate the air/hydrocarbon interface as a result of the tools' insensitivity to small changes in dielectric properties.

In a groundwater formation, assuming that the formation is lossless, the sand matrix, the water, and the gasoline can be represented by real dielectric constants $\epsilon_m$, $\epsilon_w$ and $\epsilon_g$, respectively. The following simple mixing laws can then be employed:

(1) For the water zone ("Zone I") it is assumed that the sand matrix is fully saturated with water, so that the dielectric constant for this zone ($\epsilon_I$) is $$\epsilon_I = [(1-\phi)\epsilon_m^{\frac{1}{2}} + \phi\epsilon_w^{\frac{1}{2}}]^2 \quad (1)$$

where $\phi$ is porosity (i.e., the void volume fraction of the matrix).

(2) For the contaminant zone ("Zone II") it is assumed that the sand matrix is fully saturated with gasoline, so that the dielectric constant for this zone ($\epsilon_{II}$) is $$\epsilon_{II} = [(1-\phi)\epsilon_m^{\frac{1}{2}} + \epsilon_g^{\frac{1}{2}}]^2 \quad (2)$$

(3) For the air zone ("Zone III") it is assumed that the sand matrix is completely dry (air-filled), so the dielectric constant for this zone ($\epsilon_{III}$) is $$\epsilon_{III} = [(1-\phi)\epsilon_m^{\frac{1}{2}} + \phi^{\frac{1}{2}}]^2 \quad (3)$$

Typical values of $\epsilon_m$, $\epsilon_w$, and $\epsilon_g$ are $\epsilon_m = 4.6$, $\epsilon_w = 78$, $\epsilon_g 2.4$. For $\phi = 30\%$, we find: $\epsilon_I = 17.2$, $\epsilon_{II} = 3.9$, $\epsilon_{III} = 3.2$.

The problem with prior art logging tools becomes immediately obvious from the above. While the contrast between Zones I and II is great, the contrast between Zones II and III is marginal. Such a contrast would not be noticeable by the conventional electromagnetic (dielectric) logging tools, even if such tools were capable of logging through a plastic casing. The Schlumberger Electromagnetic Propagation Tool, for example, is a padtype tool and is designed to operate when in direct contact with the formation. The antennas used herein are matched to look through a plastic casing into a formation, while EPT antennas are matched to look directly into the formation (with the size of the slot, the size of the cavity, and the type of filling). Without the ability to discriminate between Zones II and III (the air and gasoline zone), it would be impossible to quantify the thickness of the plume. The Schlumberger DPT tool is a centralized tool and uses a relatively low frequency transmission device for the purpose of deep penetration, but results in poor spatial resolution. It is, therefore, not useful for the present purpose where vertical resolution to a few inches is required.

FIG. 4 schematically illustrates the well logging tool described herein. The probe is a pad 17 on the logging tool 18 that is inserted in plastic well casing 19. The curvature of the pad surface matches that of the inside wall of the plastic casing. On the pad are a receiving antenna 22 and two transmitting antennas 21 and 23 which are located equal distances above and below the receiving antenna.

FIG. 5 is a simplified RF (radio frequency) block diagram for the device. A signal from source 24 and transfer switch 25 is transmitted to either the sum (Σ) or the difference (Δ) channel of 180° hybrid 51. The hybrid is a passive four-port device which, if fed through the Σ port, divides the power into two equal portions whose amplitudes are in phase; if fed through the Δ port, these amplitudes are 180° out of phase. Receiving antenna 22 monitors the transmitted signals.

Referring now to FIG. 6, it can be assumed that the three antennas are identical in all respects, and that they are matched to radiate efficiently into the plastic material (having a dielectric constant $\epsilon_p$). It can be further assumed that the antennas can be treated as point sources, and that the propagation of radiation can be treated in terms of ray optics. FIG. 6 shows the signal paths from antenna 21 to 22, and from antenna 23 to 22 into and through the casing well 19. The paths through the formation (21, B, C, 22 and 23, E, F, 22) suffer larger geometric spread and one additional reflection (at the plastic/formation interface) as compared to the paths in the plastic material (21, A, 22 and 23, D, 22). Therefore, the contribution of the former paths can be neglected.

If x is the coordinate of the receiving antenna measured from some reference depth in the well bore (as shown in FIG. 6), let $\epsilon(x)$ be the dielectric constant of the formation at location x and let d be the distance between the receiving and transmitting antennas (as shown in FIG. 6). When the wall of the casing 19 is thin, the formation is in the near field of the antennas, and influences their radiation efficiency. This efficiency is difficult to quantify. However, we can obtain an ad hoc estimate for this efficiency by assuming that the impedance contrast between the plastic and the formation in the near field of the radiating antenna causes the reflected radiation to ga back into the antennas and onto the source. This efficiency is thus equal to the ratio of the amplitude transmitted into the formation to that of the amplitude of the forward-traveling wave at the antenna aperture, which is assumed to be unity Thus, the efficiency [$\eta(x)$] is:

$$\eta(x) = 1 - \frac{\sqrt{\epsilon(x)} - \sqrt{\epsilon_p}}{\sqrt{\epsilon(x)} + \sqrt{\epsilon_p}} \quad (4)$$

$$= \frac{2\sqrt{\epsilon_p}}{\sqrt{\epsilon(x)} + \sqrt{\epsilon_p}}$$

This expression assumes that $\epsilon(x)$ is always greater than $\epsilon_p$ which will always be true for a plastic cased well. This efficiency also applies to the receiving antenna.

The power received at the receiving antenna for the sum and the delta modes respectively can now be written as $$\Sigma(x) = C\left[\eta(x)\eta(x+d)\frac{\sqrt{\epsilon(x+d/2)} - \sqrt{\epsilon_p}}{\sqrt{\epsilon(x+d/2)} + \sqrt{\epsilon_p}} + \eta(x)\eta(x-d)\frac{\sqrt{\epsilon(x-d/2)} - \sqrt{\epsilon_p}}{\sqrt{\epsilon(x-d/2)} + \sqrt{\epsilon_p}}\right]^2 \quad (5)$$

$$\Delta(x) = C\left[\eta(x)\eta(x+d)\frac{\sqrt{\epsilon(x+d/2)} - \sqrt{\epsilon_p}}{\sqrt{\epsilon(x+d/2)} + \sqrt{\epsilon_p}} - \eta(x)\eta(x-d)\frac{\sqrt{\epsilon(x-d/2)} - \sqrt{\epsilon_p}}{\sqrt{\epsilon(x-d/2)} + \sqrt{\epsilon_p}}\right]^2 \quad (6)$$

where C is a geometric constant which need not be determined since the absolute value of $\Sigma$ and $\Delta$ will not be important (i.e., only changes in these values will be important).

Equations (5) and (6) can now be used to generate the series of idealized logs discussed below. The logs below assume $\epsilon_I=17.2$, $\epsilon_{II}=3.9$, $\epsilon_{III}=3.2$ and $\epsilon_p=2.0$, $d=2''$, the thickness of the plastic$=\frac{1}{4}''$, and the dry sand porosity is 30%. The probe response was calculated at every 0.1 inch interval, and then a fivepoint averaging was applied to the calculated data in order to partially simulate the effect of a finite antenna aperture.

In FIG. 7 there is no spilled hydrocarbon layer, i.e., this is the case of a "clean" water table. As the tool is moved upward through a clean water table and into the air-saturated portion, the sum signal goes through a twin peak, and then shifts to a constant lower level. The delta signal also goes through a twin peak, and then drops back to zero.

The separation distance between antennas is the principal parameter defining the spatial resolution of the probe. In these idealized well logs, this distance is 4 inches. FIGS. 7 to 13 show the evolving features of the logs as the thickness of the spilled layer gradually increases and exceeds the distance between the transmitting antennas.

In the sum channel, we see the gradual emergence of two twin-peaks, corresponding to the two formation zones of fluids with different dielectric properties. These two twin-peaks are clearly discernible starting in FIG. 11, where the thickness of the spilled layer equals 2 times. In FIG. 13, we observe three fully developed segments of constant signal levels, corresponding to the water, the hydrocarbon, and the dry zones.

For the delta channel we observe, again beginning in FIG. 11, the emergence of a distinct peak feature for the hydrocarbon layer/dry sand interface. By FIG. 13, the three formation zones have been well demarcated.

Lastly, we note that the probe response is a convolution of the array pattern of the antenna arrays 21, 22, and 23 with the dielectric profile $\Sigma(x)$. Thus, it may be possible to employ a deconvolution procedure to recover this profile even when the spilled layer thickness is somewhat smaller than the distance between the transmitting antennas.

While the above discussion reeers to the logging tool in general terms, prototype tools have been constructed in order to refine the design of the logging tool and its related equipment. FIG. 14 illustrates the logging tool as it is being raised and lowered (preferably raised to prevent hang-up) in the well. Wellbore 2 is completed with a non-perforated casing 19 which is Schedule 40 PVC. The bottom of the casing is isolated with cap 26 (PVC) and the casing is held centrally within the wellbore with non-metallic centralizers 27. A cement plug 102 is preformed around the casing to weight it below the water table. In the preferred embodiment the wellbore is 12" in diameter and there is a 3.75" annulus between the casing and the wellbore.

It is important to evenly sand/gravel pack the annulus of the well in order to achieve good results with the invention. The grain size of the gravel (or sand) 28 is chosen to match as closely as possible that of the surrounding formation. In the preferred embodiment for a formation in Boise, Id., this is chosen to be between 20 to 60 mesh. Cement grout seal 29 is installed above the sandpack for the purpose of preventing the intrusion of surface waters into the gravel pack.

The logging tool 18 consists of antenna pad 17 mounted on body 30. Antenna 21, 22 and 23 are contained within the antenna pad. Pressure arms 31 are provided in order to keep the tool stable and pressed against the casing in the well. The tool is held in the wellbore with cable 32 which is raised and lowered in the wellbore with a constant speed winch 33 and tripod 34. Information from the tool is transmitted to instrumentation and recording equipment 36. This recording equipment provides both analog real-time results and digitally recorded data. A weight 100 is used to keep the cable taut. Pre-installed metallic bands 101 can be used as depth markers/calibrators. It may be desirable to use separate cables for raising/lowering the tool and for transmitting data.

Greater detail regarding the construction of a first embodiment of the logging tool is provided in FIG. 15. To provide both high vertical resolution and deep probing depths, two banks of antennas are provided. The lower bank of antennas 37 is designed to give the best vertical resolution (approximately 2 inches) while probing a relatively shallow depth (approximately 1 inch). The three antennas (38, 39, and 40) are of the cavity-backed slot type having an aperture dimension of $1\frac{5}{8}''\times\frac{1}{4}''$. The small dimensions of the aperture necessitates that the antenna cavity be partially filled with deionized water and then filled completely with a silicone rubber compound (Silastic TM 732 RTV adhesive/sealant made by Dow Corning). The return loss characteristics of the antennas result in an operating frequency of 1225 MHz.

In order to minimize direct coupling between the antennas via surface currents, the antennas are staggered so as to be arranged in a spiral fashion. The plane of polarization of the lower bank of antennas 37 is vertical.

The upper bank of antennas 42 is designed to give somewhat deeper probing depth (approximately 2 inches) at the sacrifice of some resolution. The two transmitting antennas, 43 and 44, are also the cavity backed, water/Silastic ™ filled slot type, but have an aperture of 3½ inches by ¾ inch, and are turned 90° with respect to the lower bank antennas. Thus, the plane of polarization of these antennas is horizontal. The orthogonality of polarization of the two antenna banks provides sufficient isolation between them if they were to be operated simultaneously.

In the upper bank the receiving antenna 45 differs from the transmitting antennas in that it is a slot in a metal sheet, backed by a cavity filled with deionized water and Silastic ™. The "long" dimension of this cavity is horizontal, thus permitting the two transmitting antennas to be in close proximity to each other (5½ inches).

"Choke" slots 46 and 47 are placed between the transmitting antennas and the receiving antenna to minimize direct coupling. These slots are filled with RT Duroid ™ dielectric having a dielectric constant of approximately 10.

The return loss characteristics of the upper bank of antennas give rise to a common operating frequency 1100 MHz. Pressure arm 31 holds the tool in place in the well.

Internally, the logging tool includes RF source 48, variable attenuator 49, switches 50, 54 and 55, hybrid 51, amplifier 56 and receiver 57. The function of these devices is discussed in greater detail below.

FIG. 16 is an RF system block diagram for the tool in the first embodiment. The device consists of a 1-2 GHz microwave source 48 which transmits a signal through a variable attenuator 49. Switch 50 alternately transfers the microwave signal to the sum port 52 and the delta port 53 of the 180° hybrid, 51. Switches 54 and 55 alternately transfer the Σ and Δ signals to the upper bank 42 and lower bank 37 transmitting antennas.

Receiving antennas 39 and 45 send the received signal through switch 55 to 20 dB amplifier 56, and on to receiver 57. Appropriate cables are phase matched.

FIGS. 17a, b, and c show a second (preferred) embodiment of the logging tool. In this embodiment only a single bank of antennas consisting of a single transmitting antenna 60 and two receiving antennas 61 and 62 are provided. The antennas are identical and no longer have a staggered arrangement; their phase centers are placed along a vertical line. The decoupling between the transmitting and receiving antennas is achieved by placing choke slots 59 filled with radio frequency absorbing material between them. The spacing between the transmitting antenna 60 and the receiving antennas 61 and 62 is 1 inch and the path of propagation of radiation is reversed, i.e., there is a single transmitting antenna 60 and two receiving antennas 61 and 62. Three amplifiers/receivers 76 are utilized in this embodiment.

A third channel called the "mismatch" channel measures the power reflected from the transmitting antenna due to mismatch between the antenna and the formation/ casing combination.

A 15-Volt DC power source 74 and a 20-Volt power source 75 supply the electrical energy for the device.

An RF source 63, variable attenuator 64, hybrid 68, and rollers 80 are also provided. Information is transmitted to the surface via multiple conductor cable 77. In the second preferred embodiment the device is held in the well with pressure wheels 80 which provide a smoother tool traverse during logging. Directional coupler 65 is used to sample the power reflected back from the transmitting antenna, so as to provide a MISMATCH signal.

FIG. 18 provide an RF diagram for the second preferred embodiment. As shown, this device operates and records data simultaneously on all three channels on a continuous basis, removing the need for any switches In this embodiment source 63 transmits a signal to variable attenuator 64 and through directional coupler 65 to transmitting antenna 60. Receiver 66 and amplifier 67 provide information regarding mismatch between the antenna and formation.

Signals received at the receiving antennas 61 and 62 are combined in a 180° hybrid 68 to generate the S Σ and Δ signals, which are amplified in amplifiers 69 and 70 before being detected at the receivers 71 and 72. Note that in this embodiment the center antenna is a transmitter and the upper and lower antennas are receivers. The path of the radiation here is reversed from that described earlier, but achieves the same result.

As would be expected, actual well logs are often less than ideal and some degree of experience must be used in their interpretation. FIGS. 19 and 20 show well logs obtained with the above described tools.

In general, the primary emphasis in interpreting the well logs is on the delta channel. The sum and the mismatch channels provide additional information which is used to corroborate the delta channel results, especially in the event of ambiguities.

FIG. 19 shows a sample well log for a laboratory logging well using the second preferred embodiment. An 8-inch hydrocarbon layer was established at the 17 and 5-inch levels. The hydrocarbon/water interface (labeled as 78) in the log occurs at approximately 16½" (the middle of the two high delta peaks) and the hydrocarbon/ air interface (labeled as 79) occurs at 25½" indicating a very good correlation FIG. 20 shows a sample well log obtained with the second embodiment from an aquifer in Boise, Id. with a significant layer of gasoline on its surface. The formation is a coarse sand, cobbly formation. The log indicates delta peaks at hydrocarbon/water interface at the 2690.78' elevation and an air/hydrocarbon interface at 2691.31' elevation. The sum decreases from a high level to a lower level roughly corresponding to these peaks The mismatch channel also changes levels corresponding to and supporting the delta peaks The very large negative peaks on the mismatch channel are used to electronically mark elevations during the logging process By contrast to the well logging results, a standard monitoring well indicated the top of the hydrocarbon layer to be at 2690.50 feet and the bottom of the hydrocarbon layer to be at 2689.86 feet. Therefore, the hydrocarbon thickness with a standard monitoring well would be estimated to be 7.7 inches while the logging indicates the thickness to be 6.4 inches. This difference is substantial and would be significantly greater in formation with a less coarse formation.

FIG. 21 is a well log obtained in the same formation as that described in FIG. 21 in an area where no hydrocarbon is present on the water table. The delta peak for the water/air interface is observed at the 2694.56' elevation. The sum and mismatch shift to different values at this same elevation. No other distinctive delta peak is observed, and no support for considering any of the noise peaks as another delta interface is seen in the sum and mismatch channels.

The hydrocarbon layer detected by the tool in the above-described logs is the saturated hydrocarbon layer and its associated capillary fringe. (See the Van Dam article cited earlier and incorporated by reference). This information can be used to estimate the volume of hydrocarbon spilled to groundwater.

In all of the above well logs, log interpretation can be further simplified with curve smoothing techniques familiar to one skilled in the art.

The concept of null-balanced logging would also fin utility in logging a typical crude oil production o exploratory well. The antenna for an open hole oil or gas well logging tool will be generally configured as shown above in the second preferred embodiment. However, in a crude oil production well it will be necessary to operate the device in an open hole environment since it will not be practical to utilize plastic casing and/or to maintain the hole in an air-filled condition. Therefore, the tool will be completely encased, water tight, and all internals will need to be designed for the temperature encountered in oil bearing strata. The antennas would be designed to operate efficiently when in direct contact with a lossy formation.

In addition, since the material surrounding the tool in an open hole will frequently be lossy (conductive), the sum, delta, and mismatch signals will be complex, i.e., they have both amplitude and phase components.

To account for those differences, phase discriminators are used in place of receivers. These devices give the phase and amplitude of an unknown signal n relation to a standard or reference signal.

The sum and delta signals may now be written as:

$$\Sigma^*(x) = \quad (7)$$

$$GM^*(x)[M^*(x+d) e^{ik^*(x+\frac{d}{2})d} + M^*(x-d) e^{ik^*(x-\frac{d}{2})d}]$$

$$\Delta^*(x) = \quad (8)$$

$$GM^*(x)[M^*(x+d) e^{ik^*(x+\frac{d}{2})d} - M^*(x-d) e^{ik^*(x-\frac{d}{2})d}]$$

where:

G = a "geometric spread" factor that can be determined empirically or from theoretical modeling as is done, for example, in the EPT tool.

*Indicates a complex quantity.

$k^*\left(x + \frac{d}{2}\right) = $ wave vector for the region between the transmitting antenna and the top receiving antenna.

$k^*\left(x - \frac{d}{2}\right) = $ wave vector for the region between the transmitting antenna and the bottom receiving antenna.

$k^* = $ a function of the dielectric constant and the conductivity.

$M^*(x) = $ factor arising from mismatch between the transmitting antenna and formation $M^*(x + d) = $ factor arising from mismatch between the top receiving antenna and formation $M^*(x - d) = $ factor arising from mismatch between the bottom receiving antenna and formation.

Information about M*(x) is recorded by the mismatch channel when the tool is at location x. Information about M*(x−d) has been recorded when the tool was at the location (x−d). Similarly, M(x+d) will become M*(x) when the tool is moved upward, a distance of d. Note that M*(x−d) and M*(x+d) refer to the receiving antennas but these quantities can be determined for the transmitting antenna since all three antennas are identical. Therefore, the quantities M*(x), M*(x−d) and M*(x+d) are known.

Adding and subtracting equations 7 and 8, it is found:

$$\Sigma^*(x) + \Delta^*(x) = 2GM^*(x)M^*(x+d) e^{ik^*\left(x+\frac{d}{2}\right)d} \quad (9)$$

$$\Sigma^*(x) - \Delta^*(x) = 2GM^*(x)M^*(x-d) e^{ik^*\left(x-\frac{d}{2}\right)d} \quad (10)$$

Solving for $k^*\left(x + \frac{d}{2}\right)$ and $k^*\left(x - \frac{d}{2}\right)$ $$k^*\left(x + \frac{d}{2}\right) = \frac{1}{id} \ln\left\{\frac{\Sigma^*(x) + \Delta^*(x)}{2GM^*(x)M^*(x+d)}\right\} \quad (11)$$

$$k^*\left(x - \frac{d}{2}\right) = \frac{1}{id} \ln\left\{\frac{\Sigma^*(x) - \Delta^*(x)}{2GM^*(x)M^*(x-d)}\right\} \quad (12)$$

Since all of the quantities on the right side are known for the sum, delta, and mismatch channels k*(x+d/2) and k*(x−d/2) can be determined. From these the dielectric constants and the conductivities for the regions between the transmitting antenna and each of the receiving antennas can be found using simple relations known to one skilled in the art.

As a tool travels in the well, the coupling between an antenna and the formation changes continuously because of changing formation conditions, thickness of the mudcake layer and/or rugosity of the borehole wall. The prior art tools seek to eliminate this unknown quantity by taking the ratio of the measurements made by two adjacent receiving antennas. This assumes that the two receiving antennas at a given time have the same coupling. This assumption may or may not be true, but in any event, we have no way of knowing if it is true or not for a given formation. In our tool we actually measure this mismatch, and take this into account in a direct fashion. Besides alleviating the above problem, the mismatch channel can also tell us about the borehole rugosity and the mudcake condition (qualitatively).

FIGS. 22a, b, and c illustrate the tool that would be used in the open hole application discussed above. The tool comprises of a body 81, antenna pad 82, and pressure arm 83. The antenna configuration is similar to the second preferred embodiment and includes receiving antennas 84 and 85 and transmitting antenna 86. Again, choke slots 87 are provided. Internally, the device includes power sources 88 and 89, and RF source 90. Also included in the device are the following (which are discussed in greater detail below): variable attenuator 91, power sampler 92, 3-way power divider 93, amplifiers 94, and phase discriminators 95, 96, and 97. Hybrid 98 and directional coupler 99 perform the same function as discussed in relation to the first and second preferred embodiments.

FIG. 23 shows an RF block diagram for the third preferred embodiment. FIG. 23 is best described by following the electromagnetic signal along its path. The source 88 emits a continuous-wave (CW) electromagnetic signal which passes through a forward directional coupler 92. Here, a small portion of the power is sampled off to a three-way power-divider 93 which will serve to provide three reference signals.

The main signal is then fed to a variable attenuator 91 and on through a directional coupler 99 to the transmitting antenna 86. The attenuator 91 serves to continually adjust the transmitted power depending on the nature of the formation encountered, and can be automatically controlled by a feedback loop that also samples the received power at the receiving antennas 84 and 85.

Of the power that is incident at the terminal of the transmitting antenna 86, a portion is reflected back because of mismatch between this antenna and the formation opposite it. This reflected power is sampled by the directional coupler 99, amplified in the amplifier 94a and fed to a phase discriminator 95 which also receives a reference signal from the power divider 93 upon being amplified in the amplifier 94b. The d.c. outputs of the phase discriminator 95 contain information about the phase and amplitude of the mismatch signal.

Of the energy that leaves the transmitting antenna and enters the formation, portions are received by the receiving antennas 84 and 85. These signals are combined in a 180° hybrid 98. The outputs of this hybrid are the sum and the difference of the two input signals.

The difference signal is amplified in an amplifier 94c and fed to a second phase discriminator 96 which also receives a reference signal from the power divider 93 upon being amplified in amplifier 94d. The d.c. outputs of the phase discriminator 96 contain information about the phase and amplitude of the delta channel signal.

The sum signal is likewise amplified in the amplifier 94e and fed to a third phase discriminator 97 which also receives a reference signal from the power divider 93 upon being amplified in amplifier 94f. The d.c. outputs of the phase discriminator 97 contain information about the phase and amplitude of the sum channel signal. In FIG. 23 the cables are adjusted to have the correct electrical lengths.

FIG. 24 illustrates a numerically generated well log for the third embodiment. This sample well log assumes the tool is operating at 1000 MHz and the thickness of the oil sand is 10 inches. The distance between the receiving antennas and transmitting antenna is assumed to be 2 inches. The porosity, water saturation ($S_W$), and oil saturation ($S_O$) for the three zones is shown on the Figure. The water resistivity is assumed to be 0.2 ohm-meters. As with the first two embodiments, the delta channel (here, especially the phase signal) shows a clear shift at each interface. Support for interpreting these shifts as an interface is found in the remaining channels.

FIG. 25 illustrates the use of an additional parameter which can aid in the use of the third embodiment. In this Figure, the formation and tool are the same as shown in FIG. 24. The plotted parameter, however, is "omega" (X). This empirical parameter is defined by: X=(Sum Channel amplitude) [cos (delta channel phase)]. As shown, this parameter shows a sharp delineation at the oil/water contact.

The frequency of operation of any of the above-described embodiments should preferably be such that the distance between the transmitting and receiving antennas is less than one-half the effective wavelength of the radiation. For a given tool spacing, this establishes an upper limit to the operating frequency. An approximate lower limit of the operating frequency is obtained from the consideration of resolution distance. If we wish to resolve a distance down to the spacing from the transmit to receive antenna, then this distance must be greater than approximately one-third the effective wavelength. In this way we bracket the range of operating frequencies. In typical application, this range will be approximately 1000–1500 MHz.

In the groundwater application, the tool should be operated near the top of this range, to maximize resolution. In an openhole, the tool should be operated near the bottom of the range, in order to maximize the depth of investigation. Obviously, the operating frequency can readily be varied and the optimum frequency for a given application can readily be determined by one skilled in the art.

While the above embodiments have been described with a great deal of specificity it is to be understood that the scope of the invention is not to be limited thereto, but instead should be limited only by the appended claims, along with the full scope of equivalents thereto.

What is claimed is:

1. A method of determining the location of an interface of dielectrically different material comprising the steps of:
   (a) transmitting electromagnetic radiation from a first transmitting antenna and a second transmitting antenna in a wellbore, the radiation from the first transmitting antenna and the second transmitting antenna having a common phase and amplitude, said first transmitting antenna located above said second transmitting antenna;
   (b) receiving a sum signal resultant from the step (a) at a receiving antenna located between said first transmitting antenna and said second transmitting antenna;
   (c) transmitting electromagnetic radiation from the first transmitting and the second transmitting antennas, the transmitted radiation from the first and second antennas having a common amplitude and phases differing by 180°;
   (d) receiving a delta signal resultant from step (c) at said receiving antenna;
   (e) moving said antennas across the interface; and
   (f) monitoring said sum and said delta signals for changes whereby the interface can be detected.

2. A method of determining the location of an interface of dielectrically different materials comprising the steps of:
(a) transmitting electromagnetic radiation from a transmitting antenna;
(b) receiving said electromagnetic radiation at a first receiving antenna located above said transmitting antenna to produce a first signal;
(c) receiving said electromagnetic radiation at a second receiving antenna located below said receiving antenna to produce a second signal;
(d) adding said first and second signals to create a sum signal;
(e) Phase shifting said first signal from said second signal a total 180° to produce phase shifted signals;
(f) adding said phase shifted signals to create a delta signal;
(g) moving said antennas across the interface; and
(h) monitoring said sum and said delta signals for changes whereby the interface can be located.

3. The method as recited in claim 1 or 2 wherein said dielectrically dissimilar materials are hydrocarbons and air.

4. The method as recited in claim 1 or 2 wherein the dielectrically dissimilar materials are a hydrocarbon in a groundwater formation and air.

5. The method as recited in claim 1 or 2 Wherein the transmitting and receiving steps are performed on a pad-type device.

6. An electromagnetic logging tool for determining the location of a hydrocarbon-bearing formation comprising:
(a) an uncased well;
(b) an enclosed logging tool, said logging tool further comprising:
 (i) an electromagnetic transmitting antenna;
 (ii) a first receiving antenna above said transmitting antenna;
 (iii) a second receiving antenna below said transmitting antennas;
 (iv) means for holding said antennas against a wall of said well;
 (v) means for phase shifting signals received by said first and said second antennas by substantially 180° to produce offset signals and means for combining said offset signals to produce a delta signal;
 (iv) means for measuring reflected signals due to impedance mismatch between the antenna and formation to produce a mismatch signal;
 (vii) means for producing reference signals of stable phase and amplitude;
 (viii) phase discriminator means for comparing the reference signals to the delta signal and mismatch signal to determine their phase and amplitude;
(c) means for providing said logging tool in said well; and
(d) means for monitoring the phase and amplitude of delta signal and the mismatch signal for changes whereby properties of the formation can be measured.

7. The method as recited in claim 5 wherein the frequency of said electromagnetic radiation is substantially in the range from 1000 to 1500 MHz.

8. The method as recited in claim 5 wherein the frequency of said electromagnetic radiation is substantially 1500 MHz.

9. The method as recited in claim 4 further comprises the step of locating a hydrocarbon/water interface.

10. The method as recited in claim 1 or 2 wherein said transmitting and receiving steps are performed adjacent to a nonmetallic casing, said plastic casing defining an air-filled well.

11. The method as recited in claim 1 or 2 further comprising the step of measuring power reflected from the material back into at least one transmitting antenna using a directional coupler attached to a power monitor.

12. Apparatus for determining the location of an interface of dielectrically dissimilar materials comprising:
(a) a first radiation transmitting means;
(b) a second radiation transmitting means, said second radiation transmitting means alternately transmitting radiation of the same phase as said first radiation transmitting means and transmitting radiation 180° out of phase from said first radiation transmitting means;
(c) radiation receiving means located between said first and said second transmitting means for producing a received signal;
(d) means for moving the apparatus across the interface; and
(e) means for monitoring said received signal for changes as the apparatus is moved across the interface whereby the interface can be located.

13. Apparatus for determining the location of an interface of dielectrically dissimilar materials comprising:
(a) a radiation transmitting antenna;
(b) a first receiving antenna vertically displaced from said transmitting antenna;
(c) a second radiation receiving antenna vertically displaced from said transmitting antenna opposite said first receiving antenna;
(d) means for phase shifting and combining a signal from said first and said second receiving antennas to produce a delta signal; and
(e) means for monitoring the delta signal for changes whereby the interface can be located.

14. Apparatus as recited in claim 13 further comprising means for adding a signal from said first and said second receiving antenna prior to phase shifting to produce a sum signal and means for monitoring the sum signal.

15. Apparatus as recited in claim 12 or 13 further comprising a pad, said pad coinciding with the inside of a wellbore and holding said transmitting and receiving antennas.

16. A method for determining the location of an interface in a petroleum formation comprising the steps of:
(a) inserting a logging tool into an uncased well at a first location;
(b) transmitting electromagnetic radiation from a transmitting antenna on said logging tool;
(c) receiving a first signal at a first receiving antenna located above said transmitting antenna;
(d) receiving a second signal at a second receiving antenna located below said transmitting antenna;
(e) phase shifting signals received by said first and said second signals substantially 180° to produce offset signals;
((f) combining said offset signals to produce a delta signal;
(g) moving said logging tool to a second location; and
(h) monitoring a phase of said delta signal for changes as said tool is moved whereby said interface location can be determined.

17. Apparatus as recited in claim 15 wherein said transmitting and said receiving antennas are adapted to operate substantially in the frequency range from 1000 to 1500 MHz.

18. Apparatus as recited in claim 15 wherein said transmitting and receiving antennas are adapted to operate at a frequency of substantially 1500 MHz.

19. Apparatus as recited in claim 12 or 13 further comprising means to monitor power reflected from said transmitting antennas.

20. Apparatus as recited in claim 12 or 13 further comprising an air-filled, plastic cased well, said well adapted to receive said antennas.

21. Apparatus as recited in claim 20 wherein said well is drilled substantially into a groundwater formation.

22. Apparatus as recited in claim 12 or 13 wherein said means for moving is a winch connected to said apparatus via a cable.

23. Apparatus as recited in claim 12 or 13 further comprising a second bank of antennas, said second bank of antennas in closer proximity to each other than said first bank of antennas to give increased vertical resolution.

24. Apparatus as recited in claim 12 or 13 wherein said antennas are cavity backed slot antennas impedance-matched to transmit through a nonmetallic casing.

25. Apparatus as recited in claim 24 wherein said cavity back slotted antennas are filled materials selected from the group (a) with a silicone rubber compound and deionized water and (b) ceramic barium titanate chips and epoxy.

26. Apparatus as recited in claim 12 or 13 wherein said antennas are staggered in a spiral fashion.

27. Apparatus as recited in claim 12 wherein a long dimension of said receiving antenna is horizontal.

28. Apparatus as recited in claim 12 or 13 further comprising choke slots between said antennas.

29. Apparatus as recited in claim 28 wherein said choke slots are filled with a dielectric material.

30. Apparatus as recited in claim 12 or 13 wherein said antennas have their phase centers placed along a vertical line.

31. Apparatus as recited in claim 30 further comprising choke slots between said antennas.

32. Apparatus for determining the thickness of a hydrocarbon on a water table comprising:
(a) a surveillance well, said surveillance well being an air-filled, nonmetallic cased well inserted into said water table;
(b) a logging tool, said logging tool further comprising:
(i) a first antenna bank, said first antenna bank further comprising: a transmitting antenna; a first receiving antenna; and a second receiving antenna;
(ii) a source of electromagnetic radiation operably connected to said transmitting antenna;
(iii) a 180° hybrid, said 180° hybrid arranged to offset signals received by said first receiving antenna and said second receiving antenna by 180° to produce offset signals and to combine said offset signals to produce a delta signal;
(c) means for recording said delta signal operably connected to said hybrid; and
(d) means for moving said logging tool in said well.

33. Apparatus as recited in claim 32 further comprising a gravel pack surrounding said cased well.

34. Apparatus as recited in claim 32 further comprising a second bank of antennas on said logging tool, said second bank of antennas spaced to provide high resolution.

35. Apparatus as recited in claim 32 wherein said first receiving antenna and said second receiving antenna and said transmitting antenna are a cavity partially filled with water and a silicone rubber compound.

36. Apparatus as recited in claim 32 wherein said first bank of antennas is a staggered bank antennas.

37. Apparatus as recited in claim 32 wherein said nonmetallic cased well is a polyvinyl chloride cased well.

38. Apparatus as recited in claim 32 further comprising choke slots in said first antenna bank between said antennas.

39. Apparatus as recited in claim 38 wherein said choke slots are filled with a dielectric material.

40. Apparatus as recited in claim 32 wherein said first antenna bank has its phase centers along a vertical line.

41. Apparatus as recited in claim 32 wherein said antennas are staggered in a signal fashion.

42. Apparatus as recited in claim 32 further comprising a winch connected to said logging tool to raise said logging tool.

43. Apparatus as recited in claim 32 further comprising means to monitor power reflected from material surrounding said casing into said transmitting antenna.

44. Apparatus as recited in claim 32 further comprising a pad, said pad containing said first antenna bank and adapted to substantially coincide to the inside of said surveillance well.

45. A method of determining the thickness of a hydrocarbon layer on a groundwater table comprising the steps of:
(a) installing an air filled nonmetallic well casing in a wellbore, said wellbore traversing the hydrocarbon layer on the groundwater;
(b) transmitting electromagnetic radiation from the well with a transmitting antenna;
(c) receiving the electromagnetic radiation in the well with a receiving antenna;
(d) moving the transmitting antenna and the receiving antenna in the well casing traversing through the hydrocarbon layer on the groundwater; and
(e) monitoring radiation received by the receiving antenna for phase changes whereby the thickness of the hydrocarbon layer can be determined.

46. Apparatus as recited in claim 44 wherein said antennas are adapted to operate in the frequency range from 1100 to 1500 MHz.

47. Apparatus as recited in claim 44 wherein said antennas are adapted to operate at a frequency of substantially 1500 MHz.

* * * * *

UNITED STATES PATENT AND TRADEMARK OFFICE
CERTIFICATE OF CORRECTION

PATENT NO. : 4,831,331
DATED : May 16, 1989
INVENTOR(S) : Bibhas R. De et al

It is certified that error appears in the above-identified patent and that said Letters Patent is hereby corrected as shown below:

Claim 2, Col. 15, line 12, "(d) adding said first and second" should read --(d) adding said first and said second--.

Claim 2, Col. 15, line 15, "a total 180°" should read --a total of 180°--.

Claim 5, Col. 15, line 27, "1 or 2 Wherein" should read --1 or 2 wherein--.

Claim 6, Col. 15, line 55, "(c) means for providing said" should read --means for moving said--.

Claim 16, Col. 16, line 63, "((f)" should read -- (f) --.

Claim 41, Col. 18, line 29, "signal fashion" should read --spiral fashion--.

Signed and Sealed this

Twenty-seventh Day of February, 1990

Attest:

JEFFREY M. SAMUELS

Attesting Officer     Acting Commissioner of Patents and Trademarks